(12) United States Patent
Smith et al.

(10) Patent No.: US 8,060,228 B2
(45) Date of Patent: Nov. 15, 2011

(54) FINANCIAL TRANSACTION PRODUCT WITH CONNECTION CABLE

(75) Inventors: David B. Smith, Falcon Heights, MN (US); Erin M. Borkowski, Andover, MN (US); Timothy P. Clegg, Manhatten Beach, CA (US); Primoz Samardzija, Marina del Ray, CA (US)

(73) Assignee: Target Brands, Inc., Minneapolis, MN (US)

( * ) Notice: Subject to any disclaimer, the term of this patent is extended or adjusted under 35 U.S.C. 154(b) by 0 days.

(21) Appl. No.: 12/340,429

(22) Filed: Dec. 19, 2008

(65) Prior Publication Data

US 2009/0099674 A1 Apr. 16, 2009

Related U.S. Application Data

(63) Continuation of application No. 11/604,016, filed on Nov. 22, 2006.

(51) Int. Cl.
*G06F 17/00* (2006.01)
(52) U.S. Cl. ........................................................ 700/94
(58) Field of Classification Search .................... 700/94; 705/16, 17, 41, 500; 381/87, 334, 335, 182, 381/370, 384
See application file for complete search history.

(56) References Cited

U.S. PATENT DOCUMENTS

| | | |
|---|---|---|
| 3,598,986 A | 8/1971 | Love |
| 4,055,014 A | 10/1977 | Schmidt et al. |
| D285,121 S | 8/1986 | Schwartz |
| 4,791,741 A | 12/1988 | Kondo |
| D301,716 S | 6/1989 | Ohzu |
| D302,014 S | 7/1989 | Ohzu |
| D314,574 S | 2/1991 | Kato |
| D316,550 S | 4/1991 | Sogabe |
| 5,247,293 A | 9/1993 | Nakagawa |
| 5,387,108 A | 2/1995 | Crowell |
| 5,539,819 A | 7/1996 | Sonoyama et al. |
| 5,577,918 A | 11/1996 | Crowell |
| 5,706,353 A | 1/1998 | Arai et al. |
| 5,845,425 A | 12/1998 | Leake et al. |

(Continued)

FOREIGN PATENT DOCUMENTS

GB 2277482 A 11/1994

OTHER PUBLICATIONS

"Circuit City Gift Card with Packaging," available in Circuit City retail stores at least as early as Dec. 5, 2005, 2 pages.

(Continued)

*Primary Examiner* — Walter F Briney, III
(74) *Attorney, Agent, or Firm* — Griffiths & Seaton PLLC

(57) ABSTRACT

A financial transaction product includes an electrical assembly, a housing at least partially enclosing the electrical assembly, a connection cable, and an account identifier. The connection cable includes a first end, which is coupled with the housing and in electrical communication with the electrical assembly, and a second end, which is opposite the first end, is spaced from the housing, and includes an electrical connector configured to selectively interface with a electrical device separate from the financial transaction product. The account identifier is affixed to the housing and links the housing to at least one of a financial account or a financial record. Methods of encouraging purchase and facilitating use of a financial transaction card assembly and other embodiments are also disclosed.

21 Claims, 14 Drawing Sheets

U.S. PATENT DOCUMENTS

| | | | |
|---|---|---|---|
| 6,028,752 | A | 2/2000 | Chomette et al. |
| 6,227,369 | B1 | 5/2001 | Glassman |
| 6,356,626 | B1 | 3/2002 | Ohara et al. |
| 6,402,039 | B1 | 6/2002 | Freeman et al. |
| 6,749,114 | B2 | 6/2004 | Madani |
| 6,762,583 | B2 | 7/2004 | Ho et al. |
| 6,774,795 | B2 | 8/2004 | Eshelman et al. |
| 6,832,730 | B2 | 12/2004 | Conner et al. |
| D502,694 | S | 3/2005 | Chang |
| 2001/0053076 | A1 | 12/2001 | Chien |
| 2002/0019776 | A1 | 2/2002 | Simpson |
| 2002/0112250 | A1 | 8/2002 | Koplar et al. |
| 2002/0143697 | A1 | 10/2002 | Gotfried |
| 2002/0169608 | A1 | 11/2002 | Tamir et al. |
| 2003/0018586 | A1 * | 1/2003 | Krahn ............... 705/58 |
| 2003/0218064 | A1 | 11/2003 | Conner et al. |
| 2004/0028235 | A1 | 2/2004 | Pan |
| 2004/0055188 | A1 | 3/2004 | Dolan-King |
| 2004/0075573 | A1 | 4/2004 | Beadman et al. |
| 2004/0177002 | A1 | 9/2004 | Abelow |
| 2004/0204165 | A1 | 10/2004 | Huang |
| 2004/0238625 | A1 | 12/2004 | Walker et al. |
| 2004/0246704 | A1 | 12/2004 | Burdick |
| 2004/0249489 | A1 * | 12/2004 | Dick ............... 700/94 |
| 2005/0008185 | A1 | 1/2005 | Jeong et al. |
| 2005/0109841 | A1 | 5/2005 | Ryan et al. |
| 2005/0143142 | A1 | 6/2005 | Bang et al. |
| 2005/0236490 | A1 | 10/2005 | Fortune et al. |
| 2006/0065748 | A1 | 3/2006 | Halbur et al. |
| 2006/0077684 | A1 | 4/2006 | Yuen |
| 2006/0095385 | A1 * | 5/2006 | Atkinson et al. ............... 705/64 |
| 2006/0157555 | A1 | 7/2006 | Dean et al. |
| 2006/0161439 | A1 | 7/2006 | Selg et al. |
| 2006/0276920 | A1 * | 12/2006 | Leung ............... 700/94 |
| 2006/0289657 | A1 | 12/2006 | Rosenberg |
| 2007/0215694 | A1 * | 9/2007 | Clegg ............... 235/380 |
| 2008/0221714 | A1 | 9/2008 | Schoettle |

OTHER PUBLICATIONS

"PQI Releases Credit Card Sized U510 USB Storage Device," http://www.picturecorrect.com/articles/pqi_u510_card_size_memory_review.htm, printed on Jun. 20, 2006, 2 pages.

"Credit Union Tech Talk," htlp://www.cunews.com/newsletters/2004419.htm, Apr. 19, 2004, 8 pages.

"Custom MP3 Player with USB Flash Memory Style BX," http://www.memorysuppliers.com/cump3plwiusb1.html (6 pages), printed from website on Jun. 20, 2006.

* cited by examiner

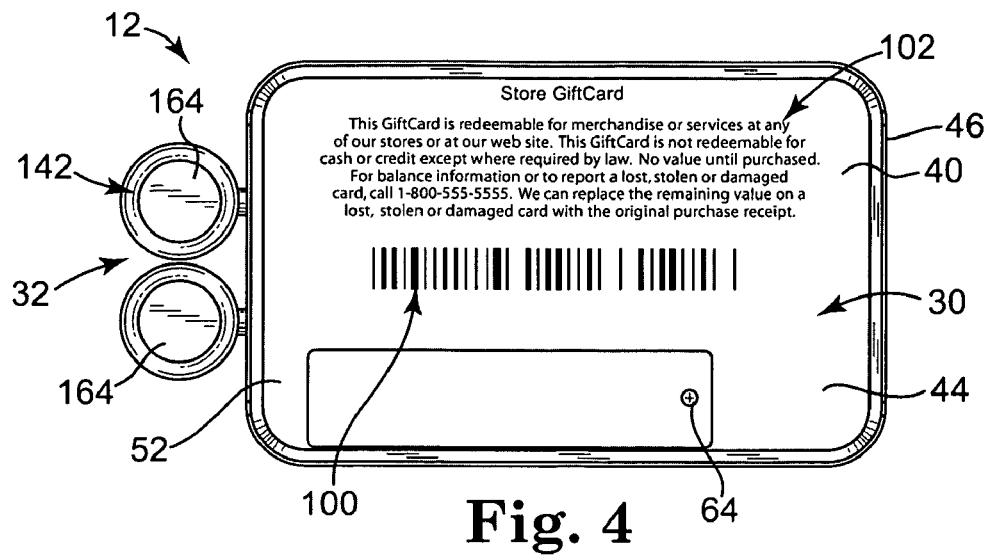
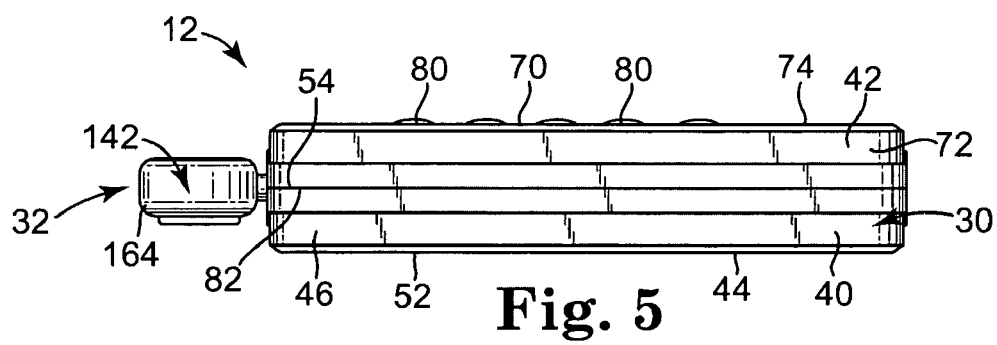
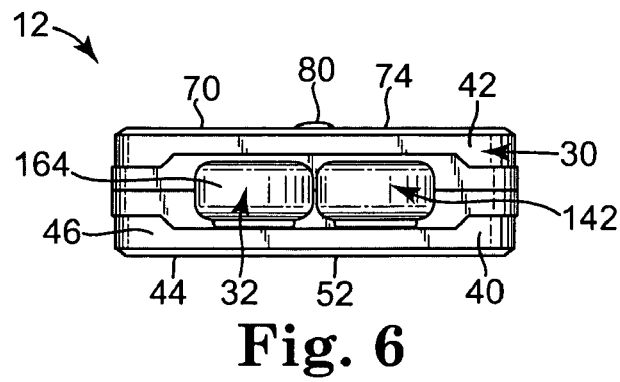
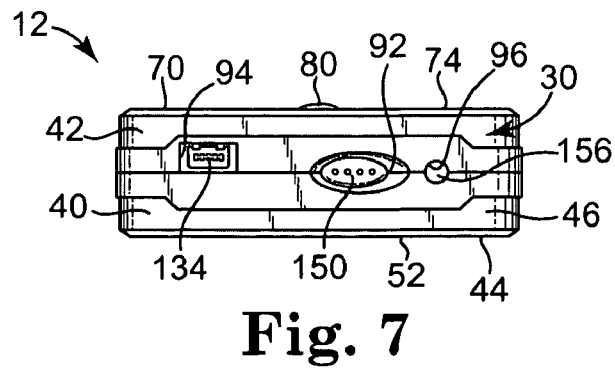

FINANCIAL TRANSACTION PRODUCT WITH CONNECTION CABLE

CROSS-REFERENCE TO RELATED APPLICATIONS

This application is a continuation of and claims priority under 35 U.S.C. §120 to U.S. patent application Ser. No. 11/604,016, filed Nov. 22, 2006 and entitled "Financial Transaction Product with Media Player," which is incorporated herein it its entirety.

BACKGROUND OF THE INVENTION

Stored-value cards and other financial transactions cards come in many forms. A gift card, for example, is a type of stored-value card that includes pre-loaded or selectively loaded monetary value. In one example, a consumer buys a gift card having a specified value for presentation as a gift to another person. In another example, a consumer is offered a gift card as an incentive to make a purchase. A gift card, like other stored-value cards, can be "recharged" or "reloaded" at the direction of the bearer. The balance associated with the gift card declines as the gift card is used, encouraging repeat visits to the retailer or other provider issuing the gift card. Additionally, the gift card generally remains in the user's purse or wallet, serving as an advertisement or reminder to revisit the associated retailer. Gift cards provide a number of advantages to both the consumer and the retailer.

SUMMARY OF THE INVENTION

One aspect of the present invention relates to a financial transaction product including an electrical assembly, a housing at least partially enclosing the electrical assembly, a connection cable, and an account identifier. The connection cable includes a first end, which is coupled with the housing and in electrical communication with the electrical assembly, and a second end, which is opposite the first end, is spaced from the housing, and includes an electrical connector configured to selectively interface with a electrical device separate from the financial transaction product. The account identifier is affixed to the housing and links the housing to at least one of a financial account or a financial record. Other related products and methods are also disclosed and provide additional advantages.

BRIEF DESCRIPTION OF THE DRAWINGS

Embodiments of the invention will be described with respect to the figures, in which like reference numerals denote like elements, and in which:

FIG. 4 is a bottom view illustrating the stored-value product of FIG. 2.

FIG. 5 is a front view illustrating the stored-value product of FIG. 2, the rear view being a mirror image thereof.

FIG. 6 is a left side view illustrating the stored-value product of FIG. 2.

FIG. 7 is a right side view illustrating the stored-value product of FIG. 2.

DETAILED DESCRIPTION

A stored-value product or other financial transaction product is adapted for making purchases of goods and/or services from e.g. a retail store or website. According to one embodiment, an original consumer buys a stored-value product to give a recipient who in turn is able to use the stored-value product at a retail store or a setting to pay for goods and/or services. A stored-value product, according to embodiments of the present invention, not only provides the consumer with the ability to pay for goods and/or services, but also functions as an media (audio and/or video) player such as an MP3 player (e.g., an MPEG-1 Audio Layer 3 player) or other suitable player configured for storing and playing compressed digital format media files and including retractable headphones. Inclusion of the media player functionality with the stored-value product promotes the sale and/or loading of the stored-value product by potential consumers and/or bearers of the stored-value product.

Figure 1:
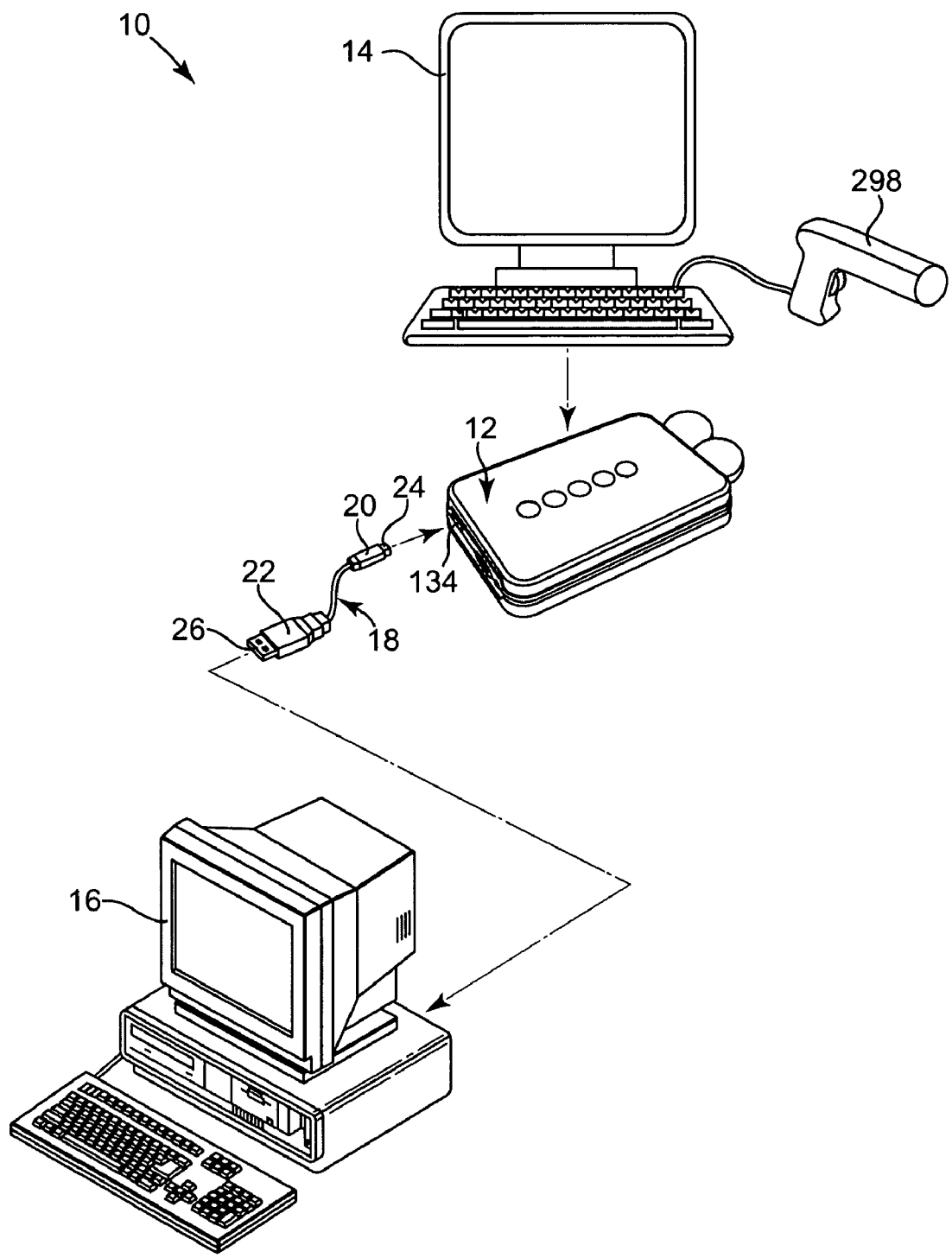
FIG. 1 is a schematic illustration of a stored-value product with a support system, according to one embodiment of the present invention.

Turning to the figures, FIG. 1 is a schematic view generally illustrating a system 10 including a stored-value product 12, a point-of-sale (POS) terminal 14, and/or a computing device 16. In particular, POS terminal 14 is configured to interact with stored-value product 12 to activate, load, and/or debit amounts from a financial account or record associated with stored-value product 12 such that stored-value product 12 provides a form of tender applicable toward the purchase of goods and/or services from an associated retailer. In one embodiment, POS terminal 14 is a cash register, kiosk, self-service check-out station, personal computer, or any other suitable terminal including a computer processing unit configured to process consumer purchases for retail sale transaction. In one embodiment, POS terminal 14 is located at a retail setting and is configured to process purchases for sale to a consumer while, in another embodiment, POS terminal 14 is remotely located from the retail setting and is configured to allow consumer interaction with a retailer website (not shown) to make one or more purchases.

Following the purchase of stored-value product 12, the consumer is able to associate stored-value product 12 with computing device 16 to allow compressed media files to be transferred between stored-value product 12 and computing device 16. For example, compressed media files including compressed audio files such as audio MP3 files, stored or otherwise accessible by computing device 16 can be transferred and stored to stored-value product 12. Computing device 16 is any suitable computing device including a processor and a memory such as a desktop or laptop computer, hand-held computing device such as a personal digital assistant (PDA) or a Blackberry™ device, mobile phone, or any other suitable device generally accessible to the consumer or end recipient of stored-value product 12. In one embodiment, computing device 16 is configured for communication via the Internet or other network (not shown), such that the computing device 16 can receive compressed audio or other media files from other sources via the network and, subsequently, forward such files to stored-value product 12 as instructed by the consumer. In one example, where POS terminal 14 is remotely located from the retail setting, POS terminal 14 and computing device 16 may be one and the same.

In one embodiment, stored-value product 12 is selectively coupled with computing device 16 using a connection cable 18. Connection cable 18 defines a first end 20 and a second end 22 opposite the first end. First end 20 includes a first connector 24 configured to be received by stored-value product 12. In one embodiment, first connector 24 is a mini-Universal Serial Bus (USB) connector or any other suitable connector. Second end 22 includes a second connector 26 configured to interface with computing device 16. In one embodiment, second connector 26 is a USB connector or other suitable connector. Connection cable 18 with connectors 24 and 26 is, thereby, configured to facilitate communication between stored-value product 12 and computing device 16. In one embodiment, connection cable 18 is eliminated and stored-value product 12 communicates with computing device 16 using other forms of communication such as radio frequency, infrared radio frequency, Bluetooth, etc.

Figure 8:
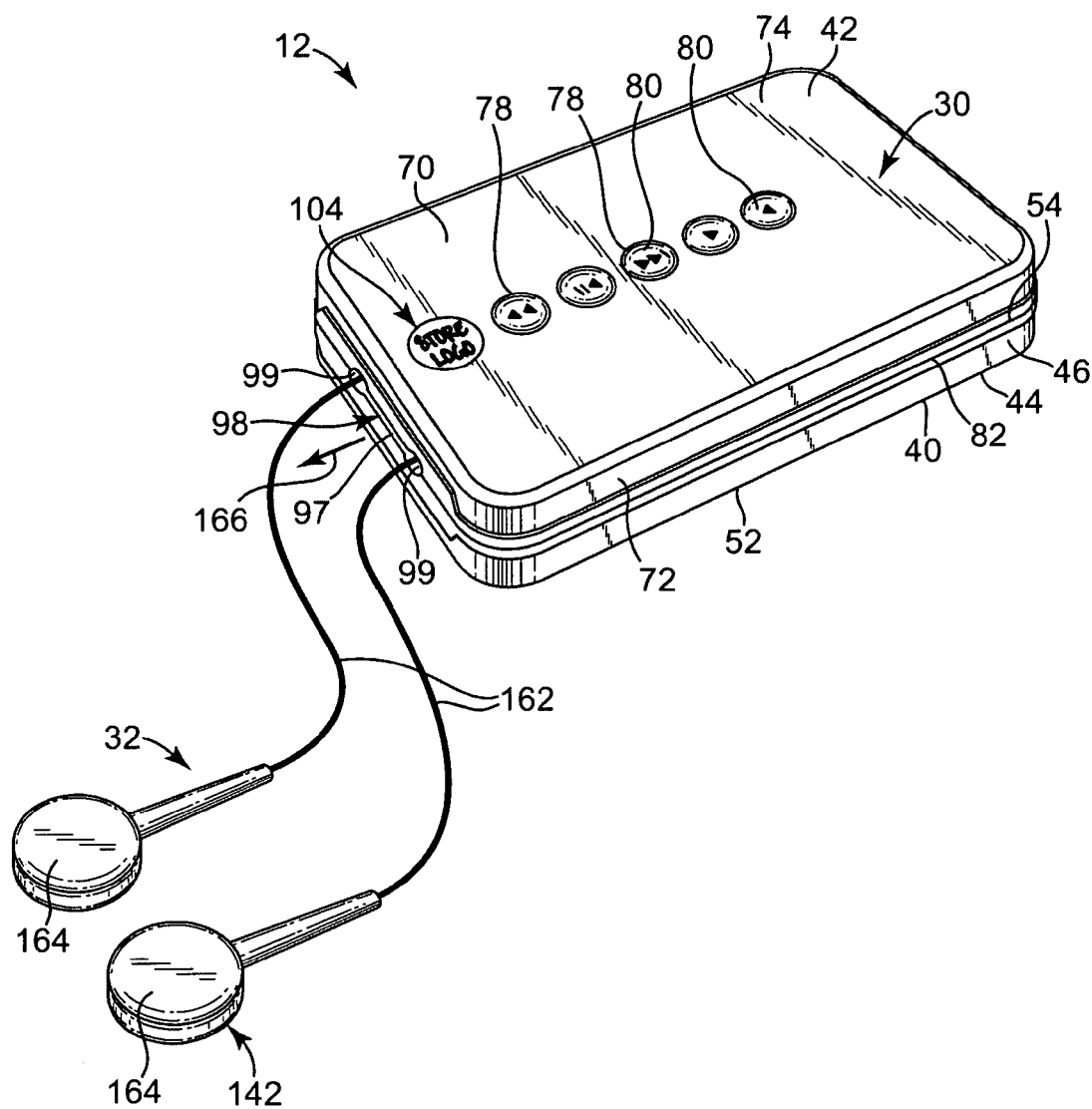
FIG. 8 is a top perspective view illustrating the stored-value product of FIG. 2 with headphones in a partially extended position.
Figure 9:
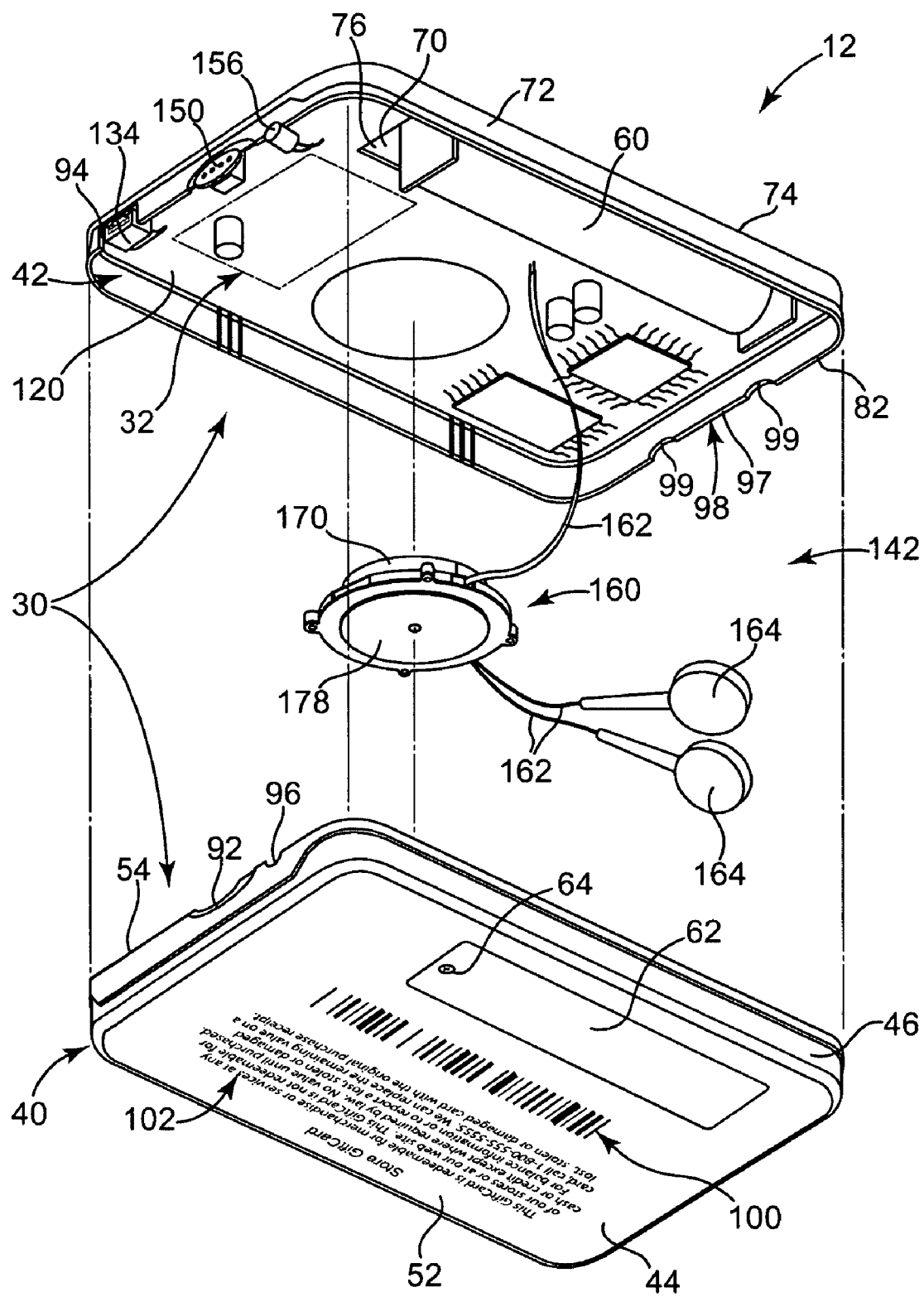
FIG. 9 is an exploded, bottom perspective view illustrating a stored-value product, according to one embodiment of the present invention.

FIGS. 2-8 illustrate various views of one embodiment of an assembled stored-value product 12 and FIG. 9 illustrates an exploded, top perspective view of the stored-value product 12 illustrated in FIGS. 2-8. Referring to FIGS. 2-9, in one embodiment, stored-value product 12 includes a housing or enclosure 30 and a media player 32 (generally illustrated in FIG. 2, more fully illustrated in FIG. 9). Media player 32 is any suitable device configured to store and play compressed media files, in particular, audio files and/or video files. Housing 30 at least partially encloses and protects media player 32.

In one embodiment, housing 12 includes a first housing member 40 and a second housing member 42 where, for example, first housing member 40 serves as a base, and second housing member 42 serves as a cover. Base 40 and cover 42 are configured to be coupled to one another and to at least partially house media player 32 therebetween.

In one embodiment, base 40 generally includes a primary panel 44 and a side wall 46. In one example, primary panel 44 is generally rectangular in shape and is sized similar to that of an identification card, a credit card, etc. In particular, in one embodiment, primary panel is about 8.5 cm long and about 5.4 cm wide. In one example, the corners of primary panel 44 and side wall 46 are rounded or chamfered. In other embodiments, primary panel 44 is otherwise shaped as a square, circle, oval, star, or any other suitable shape. Primary panel 44 defines a first or inside surface 50 (FIG. 10) and a second or outside generally planar surface 52 opposite inside surface 50.

Figure 10:
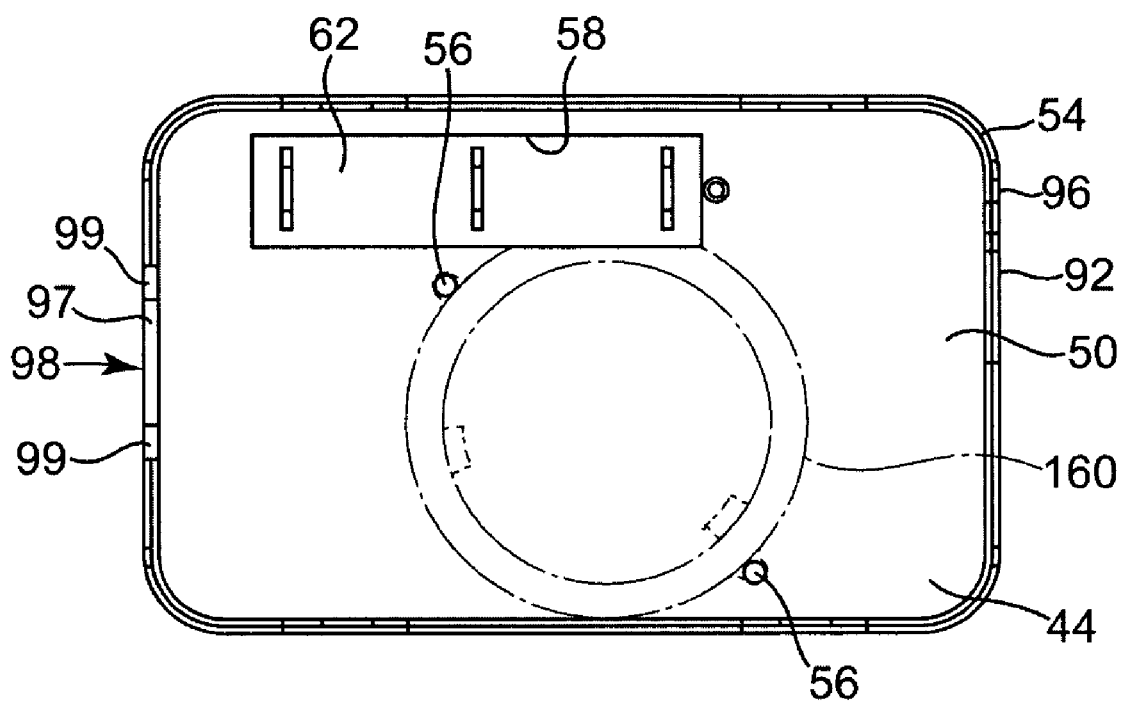
FIG. 10 is a top view of a base of the stored-value product of FIG. 9, according to one embodiment of the present invention.

Additionally referring to FIG. 10, side wall 46 generally extends from inside surface 50 of primary panel 44 generally about the entire perimeter of primary panel 44 in a direction away from outside surface 52 (e.g., FIG. 9). In one example, side wall 46 extends from primary panel 44 with a generally perpendicular orientation. Accordingly, side wall 46 defines an edge 54 opposite primary panel 44. In one example, additional protrusions such as posts 56 extend from inside surface 50 of primary panel 44 in a similar direction as side wall 46. Each post 56 extends from an interior portion of primary panel 44 and is configured to facilitate positioning and coupling of at least a portion of media player 32 with housing 30 as will be further described below.

In one embodiment, primary panel 44 defines an aperture 58 sized and shaped to permit a battery or other power supply 60 of media player 32 (FIG. 9) to be inserted into or removed from housing 30 as will be further described below. Accordingly, base 40 includes a door 62 removably or otherwise movably coupled with primary panel 44 to facilitate covering and uncovering (i.e., closing and opening) of aperture 58. In one embodiment, door 62 is at least partially coupled to primary panel 44 using a screw or other fastener 64 (e.g., FIG. 4).

Cover 42 generally includes a primary panel 70 and a side wall 72. Primary panel 70 is generally planar and defines an outside surface 74 and an inside surface 76 (FIG. 9) opposite outside surface 74. In one embodiment, primary panel 70 is of a size and shape generally similar to primary panel 44 of base 40. Primary panel 70 defines at least one aperture 78 configured to receive or at least provide access to button(s) 80 of media player 32, which will be further described below. In one embodiment, at least one aperture 78 is a plurality of similarly sized apertures 78 linearly aligned along primary panel 70.

Side wall 72 extends from inside surface 76 of primary panel 70 away from outside surface 74 and generally about the entire perimeter of primary panel 70. More specifically, in one example, side wall 72 extends with a generally perpendicular orientation relative to primary panel 70. As such, side wall 72 extends from primary panel 70 to form an edge 82 opposite primary panel 70. Edge 82 is configured to interface and be coupled with edge 54 of base 40 when base 40 is coupled with cover 42. In one embodiment, friction or snap fit, adhesive, ultrasonic welding, and/or any other suitable technique may be used to couple base 40 to cover 42. In one example, base 40 and/or cover 42 individually or collectively define additional apertures or features 92, 94, 96, and 98 configured to receive additional features of media player 32 as will also be further described below.

In one embodiment, base 40 and cover 42 are each formed of a paper material, card stock material, plastic material (e.g., polycarbonate or polyvinyl chloride), or other suitable, relatively rigid material. For example, base 40 and/or cover 42 is formed by injection molding a suitable material such as polycarbonate. Other materials and methods of forming base 40 and cover 42 are also contemplated.

Referring to FIG. 9 and/or FIG. 4, stored-value product 12 includes an account identifier 100, such as a barcode, a magnetic strip, a smart chip or other electronic device, a radio frequency identification (RFID) device, or other suitable identifier readily readable by a point-of-sale terminal, account access station, kiosk, or other suitable device readily readable by a point-of-sale terminal or other account access station or kiosk. In one example, account identifier 100 is printed to housing 30, such as outside surface 52 of base 40. Account identifier 100 indicates a financial account or record to which stored-value product 12 is linked. The financial account or record of the monetary balance on stored-value product 12 optionally is maintained on a database, other electronic or manual record-keeping system, or, in the case of "smart" cards for example, on a chip or other electronic device on stored-value product 12 itself. Accordingly, by reading account identifier 100, a financial account or record linked to stored-value product 12 is identified and can subsequently be activated, have amounts debited therefrom, and/or have amounts added thereto. Account identifier 100 is one example of means for associating stored-value product 12 with a financial account or a financial record.

In one embodiment, redemption indicia 102 are included on housing 30, such as on outside surface 52 of base 40. Redemption indicia 102 indicate that stored-value product 12 is redeemable for the purchase of goods and/or services and that, upon use, a value of the purchased goods and/or services will be deducted from the financial account or record linked to stored-value product 12. In one embodiment, redemption indicia 102 include phrases such as "<NAME OF STORE> GiftCard" and "This GiftCard is redeemable for merchandise or services at any of our stores or at our website," and/or provides help or telephone line information in the case of a lost, stolen, or damaged stored-value card, etc.

In one embodiment, other indicia are also included on housing 30 including other objects, texts, backgrounds, graphics, etc. For example, housing 30 may include brand indicia 104, which identify a brand, e.g. a product brand, a store brand, etc., associated with stored-value product 12. In one embodiment, brand indicia 104 are visible from outside surface 74 of cover 42. Any other decorative or other indicia may be disposed on housing 30. Brand indicia 104 disposed on stored-value product 12 are one example of means for associating stored-value product 12 with at least one of a product, a brand, a store, a holiday, a season, an occasion, a media format, e.g. characters, logos, scenes, or other illustrations or photographs related to at least one of a movie, television show, book, video game, etc.

As illustrated in FIGS. 9 and 10, in one embodiment, media player 32 is at least partially secured within cover 42. More specifically, media player 32 includes a printed circuit board 120 for supporting and facilitating the electrical connection of many of the components of media player 32 as will be apparent to one of skill in the art upon reading this disclosure. Additionally referring to the block diagram of FIG. 11, in one embodiment, the components of media player 32 include a microprocessor 130, a controller 132, a media port 134, a memory 136, a digital signal processor (DSP) 138, an amplifier 140, and headphones 142. Microprocessor 130 is the primary processor of media player 32 and is configured to monitor user input received from controller 132, process compressed media files received from media port 134, write to and read from memory 136, and send instructions to DSP 138 regarding how to process the media files.

Figure 2:
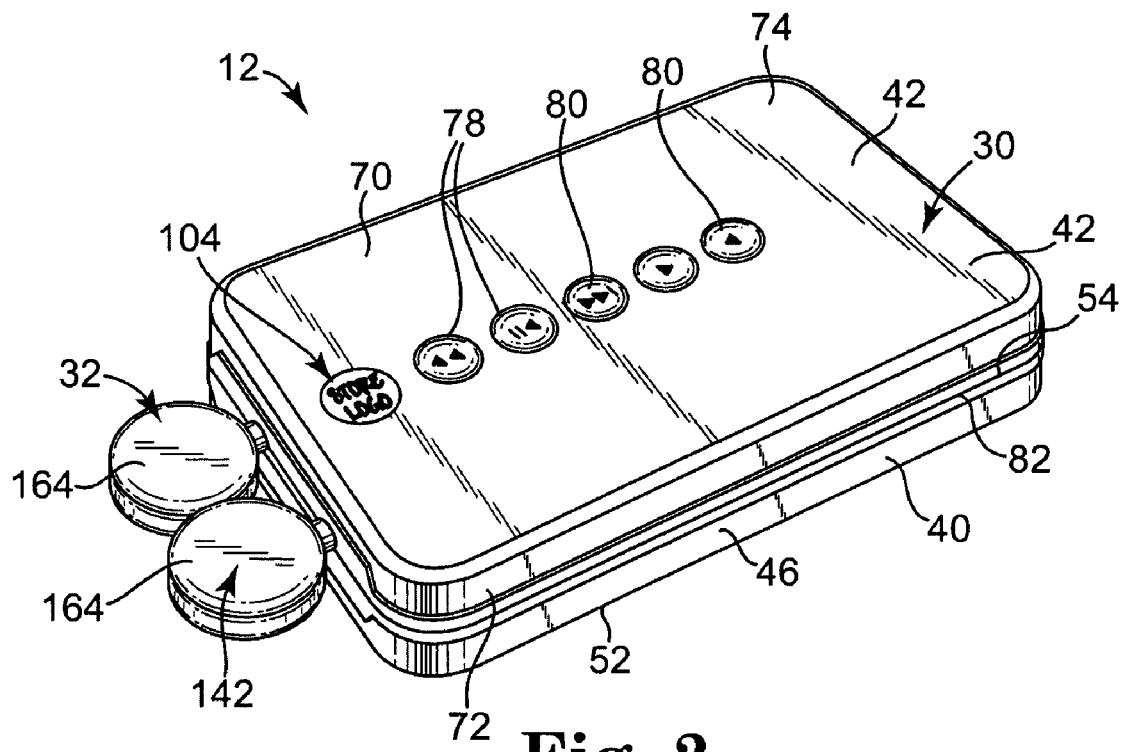
FIG. 2 is a top perspective view illustrating a stored-value product, according to one embodiment of the present invention.
Figure 3:
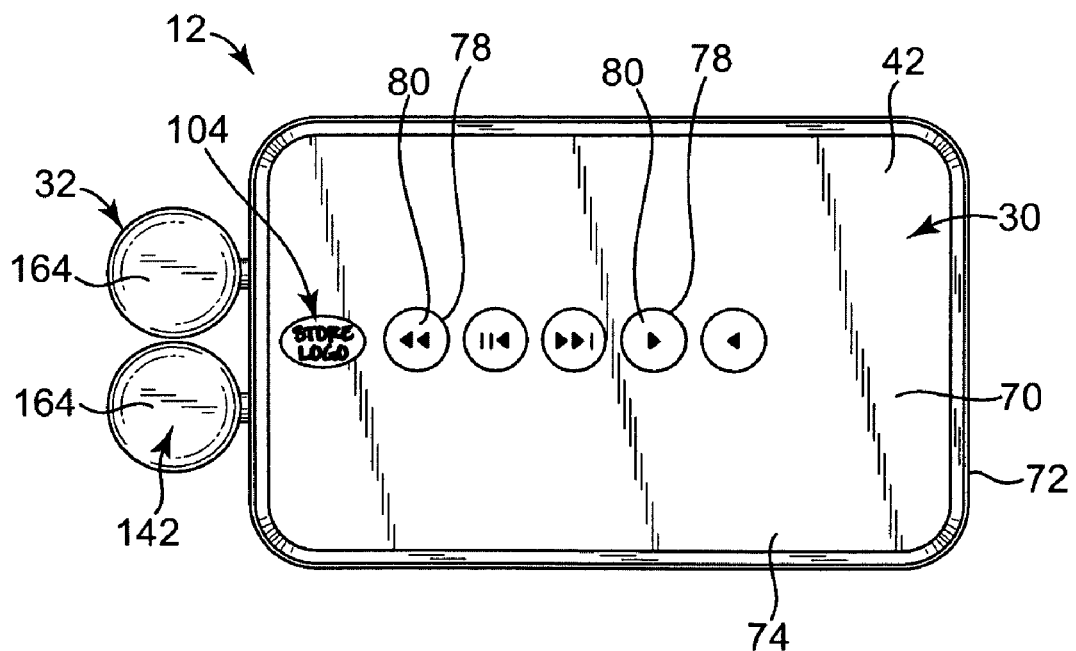
FIG. 3 is a top view illustrating the stored-value product of FIG. 2.

Controller 132 is configured to receive input from a user (e.g., the consumer or end recipient) and to communicate that input with microprocessor 130. In one embodiment, controller 132 is coupled with button(s) or switch(es) 80 positioned to be externally accessible relative to housing 30. In particular, in one embodiment, one or more dome switches (not shown) extend from top portion (not shown) of printed circuit board 120, and plastic or other suitable button(s) 80 are applied thereto and extend out of housing 30 via aperture(s) 78 as generally illustrated in FIGS. 2 and 3. In this manner, when the user depresses one of buttons 80 the associated dome switch is also depressed activating a circuit of media player 32 to indicate a function being prompted by the user. Controller 132 is configured to communication the user prompt to microprocessor 130, which, in turn, instructs the associated components of media player 32 to perform the corresponding function.

For instance, referring to FIG. 1, each button 80 relates to a different function of media player 32. In one embodiment, a button 80 is provided for each of the following functions: skip to next media file, play/pause media file, go back to previous media file, increase output volume, and decrease output volume. In other embodiments, additional button(s) 80 and associated functions may be provided and/or one or more of buttons 80 and functions described above may be eliminated.

In one embodiment, controller 132 of media player 32 is also in communication with a lock or on/off switch 150 extending out of opening 92 defined by housing 30. Lock switch 150 triggers the locking and unlocking of controller 132 such that when locked, controller 132 does not forward communications from buttons 80 to microprocessor 130. Accordingly, when locked, media player 32 will not perform functions that may be due to inadvertent depression of buttons 80.

Figure 11:
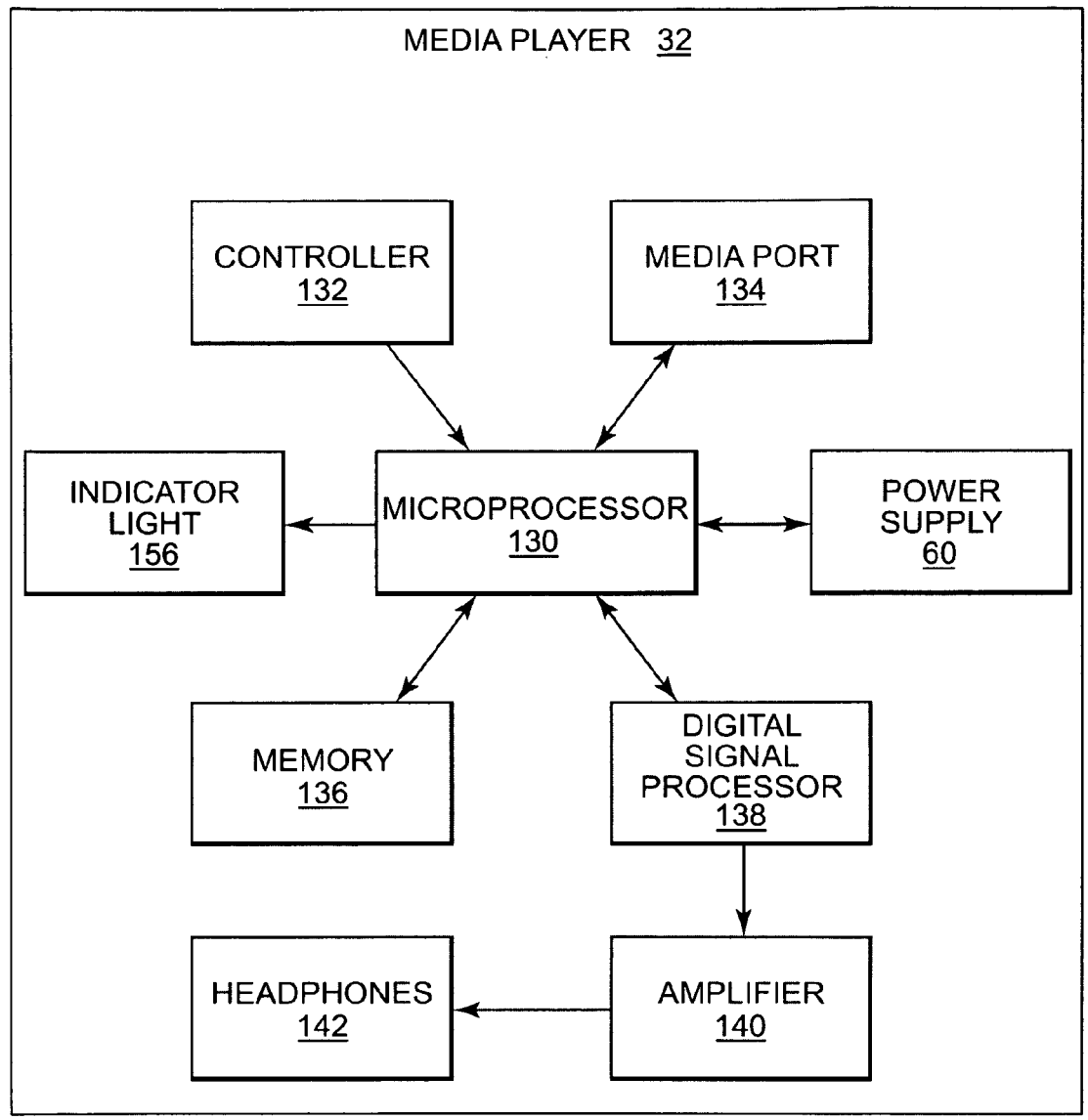
FIG. 11 is a block diagram of a media player of the stored-value product of FIG. 9, according to one embodiment of the present invention.

Referring to FIGS. 1, 9, and 11, media port 134 is any suitable port configured to facilitate communication between microprocessor 130 and computing device 16 (FIG. 1). In one embodiment, media port 134 is configured to receive first connector 24 of connection cable 18 (FIG. 1). For example, media port 134 is coupled with printed circuit board 120 such that media port 134 is in communication with microprocessor 130 and is positioned to be externally accessible with respect to housing 30. In one example, a portion of media port 134 is accessible via aperture 94 defined by housing 30 such that first connector 24 of connection cable 18 can be selectively plugged into media port 134. In this manner, when second connector 26 (FIG. 1) of connection cable 18 is plugged into computing device 16, microprocessor 130 and computing device 16 are configured to communicate with one another. In one embodiment, media port 134 may be any other suitable port to facilitate such communication. For example, media port 134 may include a connection cable partially housed by or otherwise connected to housing 30, may be a port configured to wirelessly communicate with computing device 16 eliminating connection cable 18, etc. In one embodiment, since media port 134 is configured to receive digitally compressed media files from computing device 16, stored-value product 12 is characterized by an absence of any analog signal input devices.

Memory 136 is any suitable type of memory configured to store media files in MP3 or other compressed format and/or any necessary programming code. As used herein, "MP3" files generally refers to all compressed file formats generally compatible with MP3 format files and/or playable on MP3 players, such as, for example, Window Media Audio (WMA), Waveform Audio (WAV), Music Instrument Digital Interface (MIDI), Advanced Audio Coding (AAC), Ogg Vorbis, Adaptive Differential Pulse Code Modulation (ADPCM), Advanced Streaming Format (ASF), and Vector Quantization Format (VQF) file formats. In one example, memory 136 is a solid-state memory such as internal flash memory, a flash card or other media card or stick or other suitable memory type such as an internal microdrive, small hard disk, etc. In one embodiment, memory 136 is at least partially configured to be read from and written to such that media files can be written to memory 136, later read from memory 136 and played by media player 32, and/or overwritten with a new media file. Memory 136 is supported by and coupled to printed circuit board 120 and is accessible by microprocessor 130 such that microprocessor can read from and write to memory 136.

In one embodiment, DSP 138 is also supported by printed circuit board 120 and is in communication with microprocessor 130 and memory 136. The DSP 138 is any suitable processor configured to, at the direction of microprocessor 130, pull a compressed media file from memory 136, apply any special effects and/or equalization, and stream the resultant signal to amplifier 140. For example, DSP 138 is configured to apply a decompression algorithm to the compressed media file, which decompresses the media file and converts the media file(s) from digital to analog signals. In one embodiment, the media file is an MP3 audio file, and the DSP 138 is configured to decompress the MP3 audio file and to turn the bytes of the MP3 audio file into sound waves (i.e., audio file waves), which are then forwarded to amplifier 140.

Amplifier 140 is any suitable amplifier configured to boost the strength of the signal, such as the audio signal waves, received from DSP 138 and to forward the amplified signal to headphones 142, as illustrated and as will be further described below, or to any other suitable output port or device. In one example, media player 32 includes any suitable power supply 60 configured to supply power to microprocessor 130, DSP 138, or any other portion of media player 32 requiring power. In one embodiment, power supply 60 is a battery configured to be coupled with and/or supported by housing 30 and/or printed circuit board 120 to function accordingly. In one embodiment, housing 30 includes door 62 as described above to facilitate replacement of power supply 60.

In one embodiment, media player 32 includes an indicator light 156 coupled with printed circuit board 120. Indicator light 156 is configured to be externally viewed with respect to housing 30. In one embodiment, indicator light 156 extends from printed circuit board 120 to fit at least partially through aperture 96 formed in housing 30. Indicator light 156 is configured to be selectively lit to communicate with the user of media player 32. In one embodiment, indicator light 156 is a light emitting diode (LED) and is configured to be continuously lit when media player 32 is unlocked and not currently playing the media files stored by media player 32 and is configured to flash or be intermittently lit when media player 32 is unlocked and playing media files. Other configurations of light 156 to communicate with the media player user are also contemplated.

Other variations and embodiments of media player 32 will be apparent to those of skill in the art upon reading this application. For instance, in one embodiment, where the media files are video and/or multimedia files, media player 32 may include a display (not shown) for displaying a visual component of the media files or for otherwise displaying messages to the user of media player 32.

In one embodiment, media player 32 is secured within cover 42 of housing 30 by placing printed circuit board 120 therein. More specifically printed circuit board 120 is aligned with cover 42 such that buttons 80 extend out of apertures 78 defined by cover 42, and such that power supply 60 is installed and operably coupled with the components of media player 32. In one embodiment, positioning printed circuit board 120 includes positioning lock switch 150 within aperture 92, media port 134 within aperture 94, and/or light 156 within aperture 96 of housing 30. In one example, printed circuit board 120, and thereby media player 32, is adhered or otherwise secured in place within cover 42.

In one embodiment, headphones 142 are retractable headphones configured to be at least partially stored within housing 30. For instance, in one example, headphones 142 include a retractable storage assembly 160, at least one retractable cord 162, and at least one ear bud 164 as illustrated in FIG. 9. More specifically, headphones 142 are configured such that ear buds 164 are stored adjacent to housing 30 as illustrated in FIG. 2. However, during use, a pulling force in the direction generally indicated at 166 in FIG. 8 is applied to ear bud(s) 164 to pull ear bud(s) away from housing 30 for use. Subsequently, applying a second pull force in direction 166 causes cord 162 to be retracted pulling ear bud(s) 164 back to their storage position adjacent and/or partially within housing 30. In one embodiment, media player 32 alternatively includes an output port (not shown), rather than retractable headphones 142, configured to selectively receive a plug of a separate set of headphones, speakers, etc. Other suitable output devices will be apparent to those of skill in the art upon reading this application.

Figure 12:
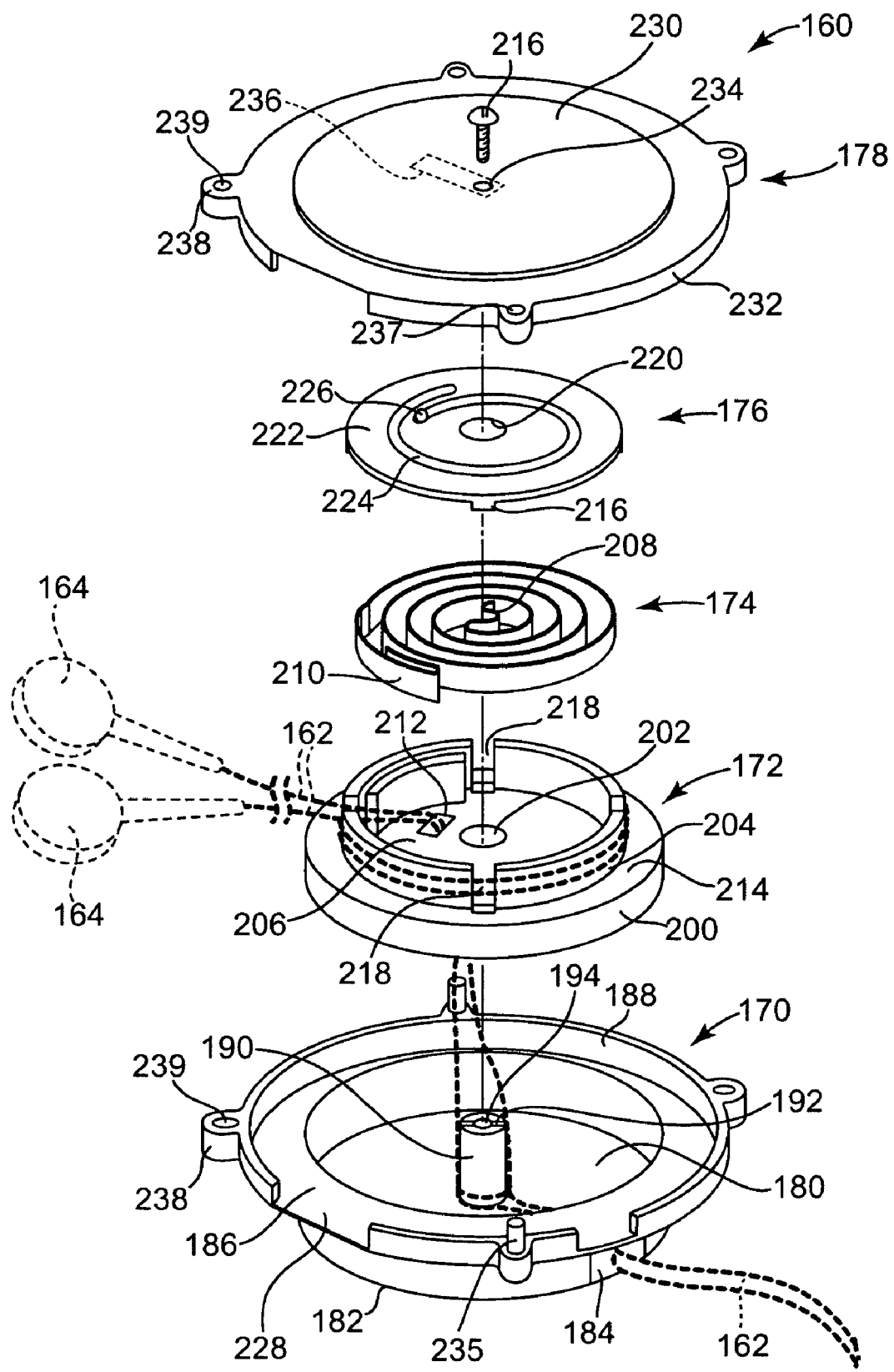
FIG. 12 is an exploded, bottom perspective view of a storage assembly for headphones of the stored-value product of FIG. 9, according to one embodiment of the present invention.

FIG. 12 illustrates an exploded view of one embodiment of a storage assembly 160 with cord 162 and ear buds 164 shown in broken lines for illustrative purposes. In one example, storage assembly 160 includes a primary receptacle 170, a rotating member or hub 172, a spring 174, a hub cover 176, and a lid 178. Primary receptacle 170 defines a cylindrical chamber 180 having a closed end 182 and at least one hole 184 extending through primary receptacle 170 into chamber 180. A flange 186 extends radially about chamber 180 opposite closed end 182, and a rim 188 extends about a perimeter of flange 186 in a direction substantially perpendicular to flange 186. A generally cylindrical axial member 190 extends from a center of closed end 182 in a direction generally perpendicular to end 182 and flange 186. In one example, axial member 190 includes a slit 192 through a width of axial member 190 as well as a cylindrical cavity 194 extending longitudinally through a center thereof.

In one embodiment, hub 172 is generally cylindrical and sized to fit at least partially within chamber 180. More specifically, hub 172 defines a relatively thick and circular planar member 200 defining an aperture 202 through a center thereof sized to receive axial member 190 such that hub 172 is configured to rotate about axial member 190. A generally cylindrical rim 204 extends from and is centered with respect to planar member 200 to define a cylindrical cavity 206. More specifically, hub 172 is coupled with primary receptacle 170 about axial member 190, and spring 174 is coiled to fit within cylindrical cavity 206. In particular, a first end 208 of spring 174 is coupled with axial member 190 that extends through hub 172 more specifically, is partially received by slit 192 of axial member 190. A second, opposite end 210 of spring 174 is coupled with cylindrical rim 204. In one embodiment, hub 172 defines a hub aperture 212 that extends from one side of hub 172 to the other allowing cord 162 to pass therethrough as will be further described below.

Hub cover 176 is a circular member having an outer diameter similar to and/or slightly larger than cylindrical rim 204 of hub 172 such that hub cover 176 interfaces with cylindrical rim 204 to substantially cover cavity 206. Hub cover 176 includes an aperture 220 through a center portion thereof sized to receive axial member 190 of primary receptacle 170. In one embodiment, a top surface 222 (i.e., a surface opposite that which interfaces with cylindrical rim 204) defines a generally circular or spiral groove 224 configured to receive at least partially receive a ball bearing 226.

Lid 178 is generally circular with a diameter similar to or larger than the outer diameter of rim 188 of primary receptacle 170. More specifically, lid 178 includes a major member 230 and a lip 232 extending around a substantially portion of a perimeter of major member 230. In one example, major member 230 defines an aperture 234 through a center of major member 230 and a radially extending groove 236 (generally indicated in FIG. 12) defined on an underside thereof and extending outwardly from aperture 234. Aperture 234 is position to align with axial member 190 upon assembly, and groove 236 is generally linear and sized to receive a portion of ball bearing 226 that extends partially out of groove 224 of hub cover 176. Lip 232 is sized and shaped to interface with, more specifically, to abut, rim 188 of primary receptacle 170. In one embodiment, primary receptacle 170, rotating member or hub 172, hub cover 176, and lid 178 are each separately formed of plastic or other suitable material and spring 174 is formed of metal or other suitable material.

Storage assembly 160 with ear buds 164 and cords 162 is assembled by placing hub 172 within cavity 194 of primary receptacle 170 such that aperture 202 fits around axial member 190. In this manner, hub 172 is rotatable about axial member 190. In one embodiment, when hub 172 is coupled with primary receptacle 170, flange 186 of primary receptacle 170 is substantially coplanar with a top surface 214 of planar member 200 of hub 172. Cord(s) 162 is thread to extend from a position external to primary receptacle 170 through hole 184 therein, into chamber 180, through hub aperture 212, and then wrapped about cylindrical rim 204 of hub 172.

First end 208 of spring is coupled with axial member 190, more specifically, is partially received by slit 192 formed by axial member 190. Spring 174 is coiled about axial member 190 and is substantially maintained within cylindrical cavity 206 defined by hub 172. Second end 210 of spring 174 is coupled to a portion of cylindrical rim 204.

Once spring 174 is in place, hub cover 176 is positioned such that aperture 220 fits around axial member 190 and cover 16 interfaces with cylindrical rim 204 opposite planar member 200 to cover or close cylindrical cavity 206, thereby enclosing spring 174 therein. In one embodiment, hub cover 176 additionally defines tabs 216, and cylindrical rim 204 defines notches 218 configured to receive tabs 216 to maintain the position of hub cover 176 relative to hub 172 when placed thereon. Ball bearing 226 is placed partially within groove 224 of hub cover 176 and partially extends above hub cover 176.

Lid 178 is positioned such that lip 232 of lid 178 interfaces with rim 188 of primary receptacle 170 thereby interposing hub 172, spring 174, and hub cover 176 therebetween. In particular, lid 178 is positioned such that aperture 234 aligns with axial member 190 and screw or other fastener 216 is threaded through aperture 234 and into cavity 194 defined by axial member 190. In one embodiment, primary receptacle 170 includes at least one coupling feature such as a post 235 configured to interact with a corresponding coupling feature such as a hole 237 of lid 178 to maintain the rotational orientation of lid 178 about axial member 190 consistent with respect to primary receptacle 170 or vice versa. When lid 178 is in place, ball bearing 226 is partially received by groove 236 of lid 178. As such, storage assembly 160 is assembled. Storage assembly 160 is but one example of a retractable storage assembly, and other suitable retractable storage assemblies will be apparent to those of skill in the art upon reading this application.

Figure 13:
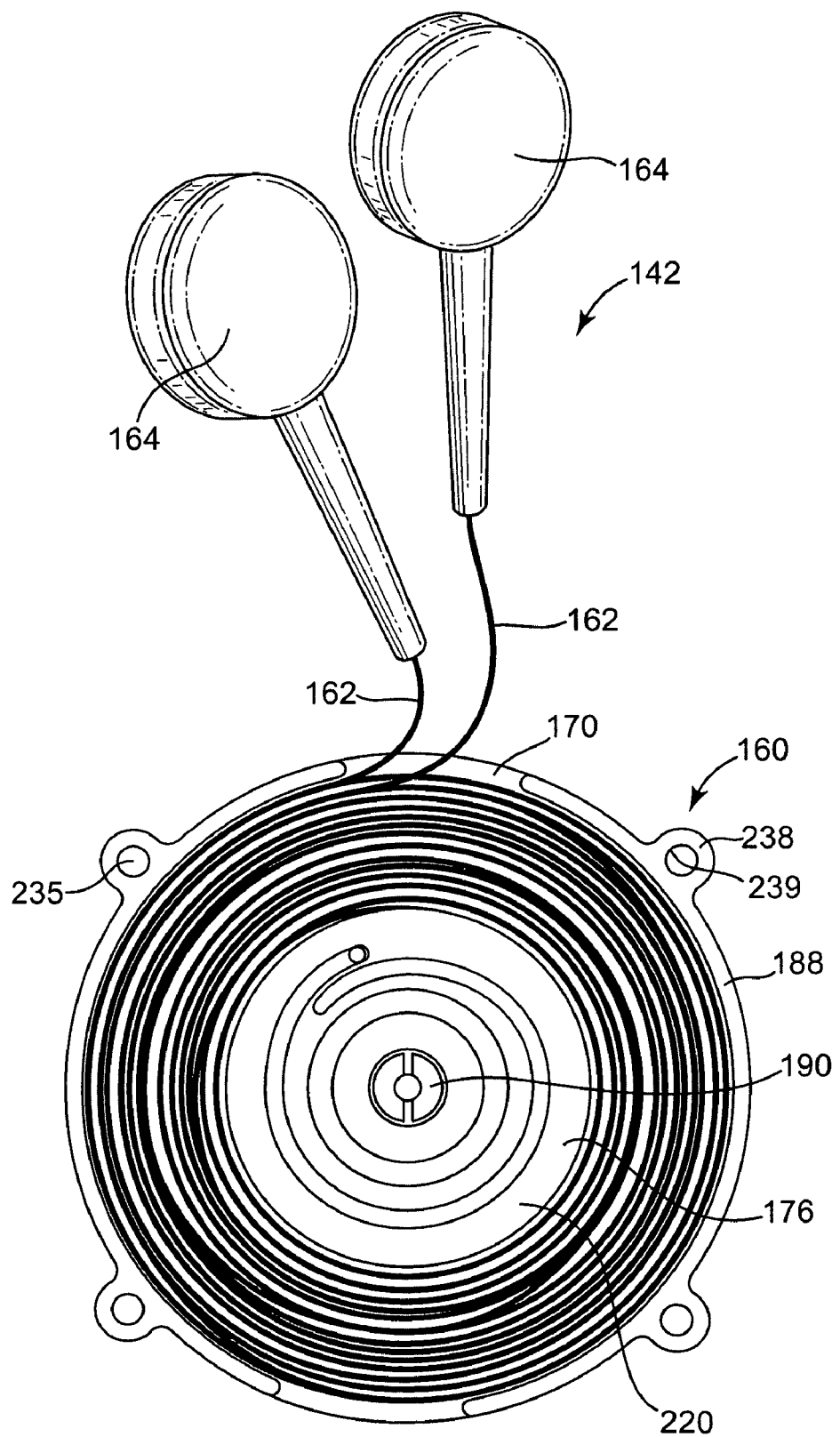
FIG. 13 is a top view of a portion of the storage assembly of FIG. 12 with ear buds and a cord, according to one embodiment of the present invention.

With additional reference to FIG. 13, when storage assembly 160 is assembled, cord 162 extends from around hub 172 out a void 228 independently or collectively defined by one or more of rim 188 and lip 232. Storage assembly 160 is configured such that when force in the direction 166 (FIG. 8) is applied, primary receptacle 170 and lid 178 remain stationary while hub 172 rotates to unwind cord 162 from around rim 204. Unwinding cord 162 preloads spring 174. In one embodiment, groove 224 is specifically configured to stop spring 174 from retracting cord 162 when headphones 142 are in use and allow retraction upon the application of an additional force such that future forces deliberately applied to cord 162 cause spring 174 to pull cord 162 back into cavity 206 of hub 172. As such, storage assembly 160 with cord 162 and ear buds 164 define retractable headphones 142.

In one embodiment, storage assembly 160 includes protrusions 238 each including a cylindrical cavity 239 or other coupling features configured to facilitate coupling of storage assembly 160 with base 40. In particular, cavities 239 are suitably sized to receive posts 56 of base 40 (as generally indicated in FIG. 10 where storage assembly 160 is illustrated in broken lines). In this manner, storage assembly 160 is secured in place relative to base 40. In one embodiment, adhesive, ultrasonic welding, or other coupling means are additionally or alternatively used to couple storage assembly 160 with base 40. In addition, an end of cord(s) 162 opposite ear buds 164 extends from storage assembly 160 and is coupled with printed circuit board 120 such that cord 162, and thereby, ear buds 164, are in communication with amplifier 140 (FIG. 11) to receive audio signal waves for playing to the user of stored-value product 12.

Subsequently, base 40 and cover 42 are coupled to one another such that portions of media player 32 including printed circuit board 120 and storage assembly 160 are substantially enclosed therebetween per the above-description such that ear buds 164 are externally maintained relative to housing 30. As illustrated with additional reference to FIG. 9, during assembly, cover 42 is aligned with base 40 are aligned with one another. Subsequently, cover 42 is placed upon base 40, or vice versa. More specifically, base 40 is placed on cover 42 such that edge 54 of base 40 interfaces with edge 82 of cover 42. In one embodiment, base 40 is coupled to cover 42 with a snap-fit connection. Other methods for coupling base 40 and cover 42 to one another such as adhesive, ultrasonic welding, etc. may additionally and/or alternatively be used. In one embodiment, assembled housing 30 has an overall length of about 8.5 cm and an overall width of about 5.4 cm.

In one example, housing 30 defines one or more apertures 98 configured to permit cord 162 to extend from storage assembly 160 within housing 30 out to the externally positioned ear buds 164. In one embodiment, apertures 98 are sized to selectively maintain ear buds in a storage position relative to housing 30 configured to prevent cord(s) 162 from being tangled. More specifically, aperture 98 includes a generally linear portion 97 having a circular portion 99 at each end. Each circular portion 99 is sized to receive a portion of cord 162 near an ear bud 164 to selectively maintain ear buds 164 during periods of non-use (i.e., for storage). Once fully assembled, stored-value product 12 is ready for sale, for compressed media file upload, and/or to play the compressed media file. In one embodiment, stored-value product 12 is "preloaded" with one or more media files prior to selling stored-value product 12 in a retail setting.

Figure 14:
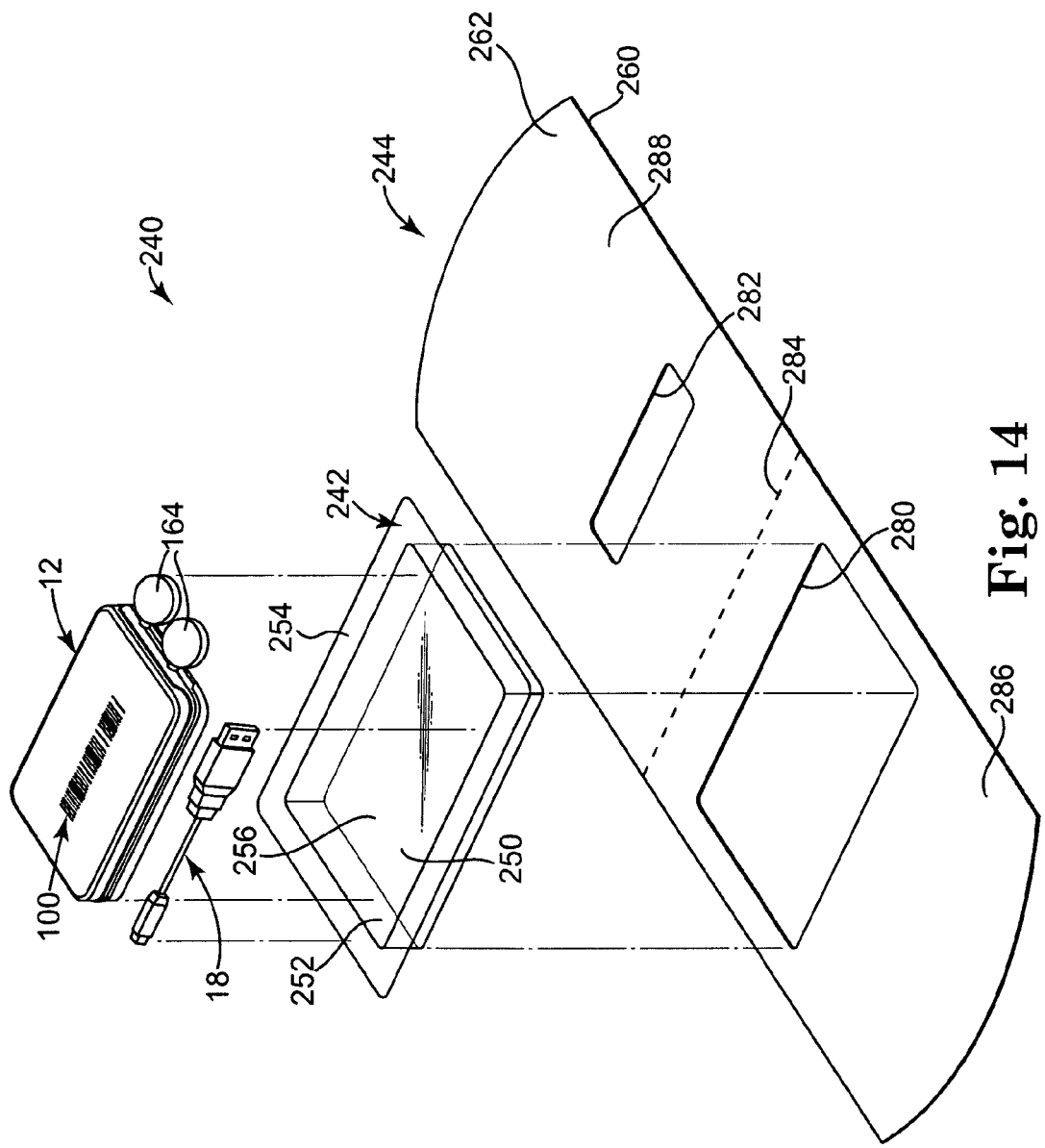
FIG. 14 is an exploded perspective view illustrating a packaged good, according to one embodiment of the present invention.

FIG. 14 is an exploded view of a packaged good 240 including a casing such as a tray 242, a backer 244, stored-value product 12 and connection cord 18. In one embodiment, tray 242 includes a major member 250, a side wall 252, and a flange 254. Major member 250 is substantially planar and generally rectangular or otherwise sized to be larger than the total width and length dimensions of stored-value product 12 when ear buds 164 are in the stored position. Side wall 252 extends about the entire perimeter of major member 250 in a first direction so as to define a cavity 256 configured to receive at least stored-value product 12 and, in one embodiment, stored-value product 12 and connection cable 18. As such, side wall 252 extends from major member 250 a distance greater than the overall thickness of stored-value product 12. Flange 254 extends radially outward about an outer perimeter of side wall 252. In one embodiment, flange 254 is substantially parallel to major member 250. In one example, tray 22 is one of translucent or transparent to permit a consumer to view stored-value product 12 prior to purchases.

Backer 244 generally comprises a single layer or multiple layers of paper or plastic material, for example, generally in the form of a relatively stiff but bendable/flexible card; however, use of other materials is also contemplated. In one example, backer 244 is substantially planar and defines a first outside surface 260, which is illustrated with additional reference to FIG. 15, and a second inside surface 262 opposite first outside surface 260.

In one embodiment, backer 244, more particularly, outside surface 260, displays indicia, graphics or text information including store logo(s), store name(s), slogans, advertising, instructions, directions, brand indicia, promotional information, holiday indicia, seasonal indicia, media format identifiers, characters, and/or other information.

Indicia 264 for example include to, from, or other fields configured to be personalized by consumer prior to giving packaged good 240 to a recipient, if consumer so chooses. Indicia 266 promote that stored-value product 12 includes media player 32. In particular, in one example, indicia 266 state that stored-value card product 12 is "also a free MP3 Player" and/or that the stored-value product 12 is a "MP3 Player GiftCard."

Indicia 268 indicate that stored-value product 12 is redeemable for the purchase of goods and/or services and that upon use, a value of the purchased goods and/or services will be deducted from the financial account or record linked to stored-value product 12. In one embodiment, indicia 268 include phrases such as "<NAME OF STORE> GiftCard" and "This GiftCard is redeemable for merchandise or services at any of our stores or at our website," and/or provides help or phone line information in case of a lost, stolen, or damaged stored-value product 12, etc.

Brand indicia 270 identify a store, brand, department, etc. and/or services associated with stored-value product 12. Instructional indicia generally indicated at 272 provide instruction regarding how to use media player 32 of stored-value product 12, for instance, how to power on and off media player 32, how to connect stored-value product 12 to computing device 16 (FIG. 1) to upload files, how to play media files stored by media player 32, and/or how to replace battery 60. Other indicia such as the indicia generally indicated at 274 may be included to provide information regarding the compatibility of media player 32 with various operating systems available for computing device 16, etc. Any of indicia 264, 266, 268, 270, 272, 274, or other indicia optionally may appear anywhere on backer 244 or stored-value product 12. Additional information besides that specifically described and illustrated herein may also be included.

In one embodiment, backer 244 includes an opening 280 and a window 282. Opening 280 is shaped similar to and sized slightly larger than an outer perimeter of side walls 252 of tray 242, but smaller than the outer perimeter of tray flange 254. Window 282 may be a simple opening or may include a transparent film extending thereover. Upon assembly, window 282 is configured to display account identifier 100 of stored-value product 12 as generally illustrated with broken lines in FIG. 15. As previously described, account identifier 100 is adapted for accessing a financial account or a financial record associated with stored-value product 12 for activating, loading, or debiting from the financial account or financial record. Accordingly, window 282 allows access to account identifier 100 to activate and/or load value onto stored-value product 12 without removing stored-value product 12 from backer 244. In one embodiment, a portion of backer 244 alternatively is configured to be folded away from the remainder of backer 244 to access account identifier 100 without removing stored-value product 12 from backer 244. In one example, account identifier 100 can be read without being visually accessible through backer 244.

Figure 15:
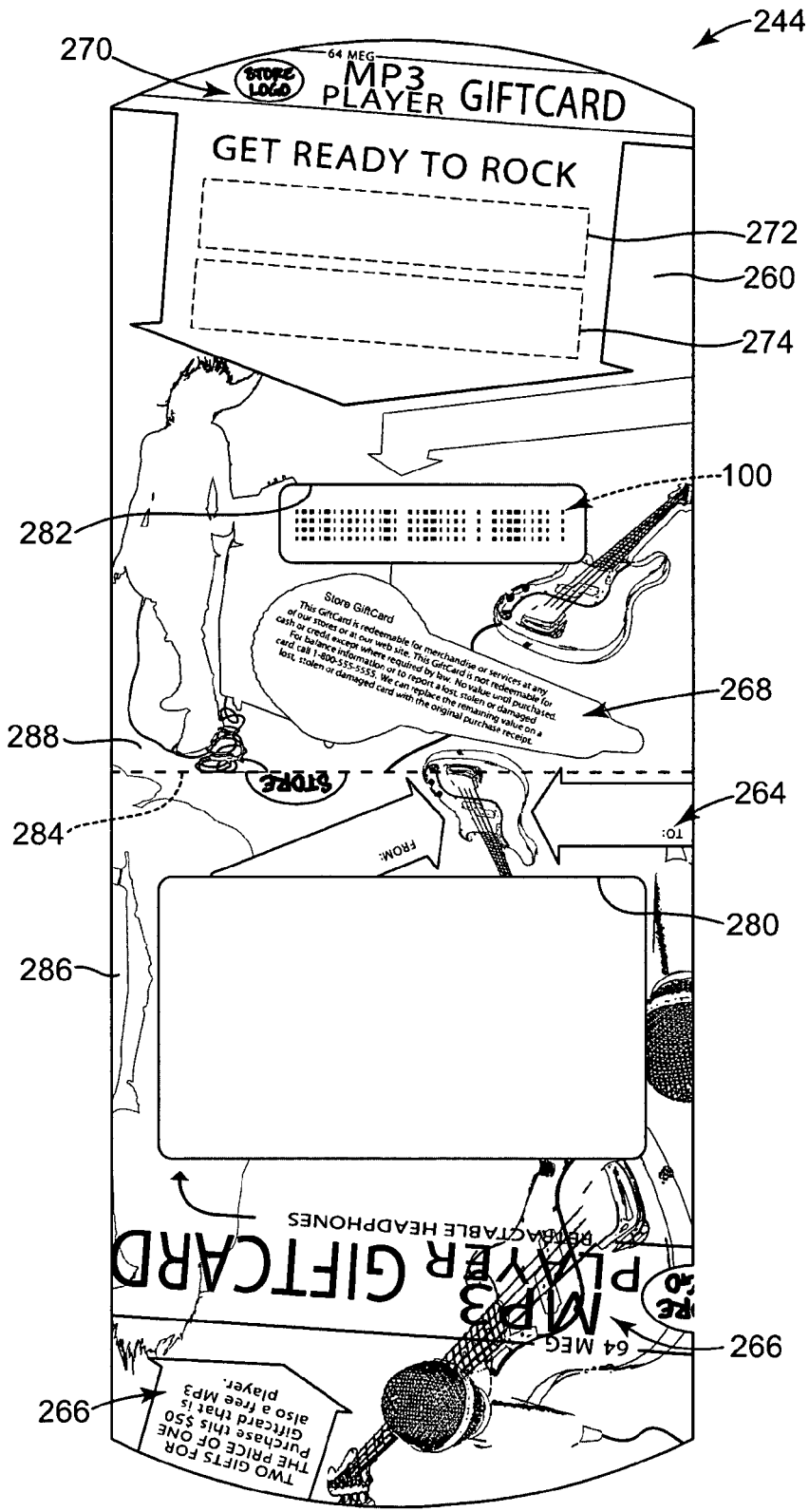
FIG. 15 is a front view of one embodiment of an unfolded backer for a supporting a stored-value product, according to one embodiment of the present invention.

In one embodiment, backer 244 is a bi-fold substrate defining a fold line 284 about which backer 244 is foldable roughly in half. As such, fold line 284 divides backer into a front 286 and a back 288. In FIGS. 14 and 15, backer 244 is unfolded, i.e. is in an open configuration. Primarily referring to FIG. 14, packaged good 240 is formed by placing major member 250 and side wall 252 of tray 242 through opening 280 of backer 244, moving tray 242 from second inside surface 262 through opening 280 and to first outside surface 260 such that flange extends generally parallel with and abuts second inside surface 262 of backer 244. Stored-value product 12 and/or connection cable 18 are placed within cavity 252. In one embodiment, additional items (not shown) such as instructions, trinkets, coupons, etc. may also be placed within cavity 252. Subsequently, back 288 is folded about fold line 284 toward front 286 such that second inside surface 262 of back 288 abuts second inside surface 162 of front 286 and interposes flange 254 of tray 242 therebetween.

An adhesive (not shown) is applied to inside surfaces 262 to adhere front 286 to back 288. Other methods of coupling front 286 to back 288 to interpose flange 254 therebetween are also contemplated and will be recognized by those of skill in the art upon reading this application. As a result, stored-value product 12, connection cable 18, and/or other items are maintained between major member 250 of tray 242 and back 288 of backer 244. In one example, stored-value product 12 is positioned relative to backer 244 such that account identifier 100 on housing 30 is viewable or otherwise accessible through window 282 defined by backer 244. In one example, other packaging methods are utilized. For instance, stored-value product 12 may be heat sealed, skinned, vacuum sealed, adhered, and/or otherwise enclosed and coupled with backer 244.

Figure 16:
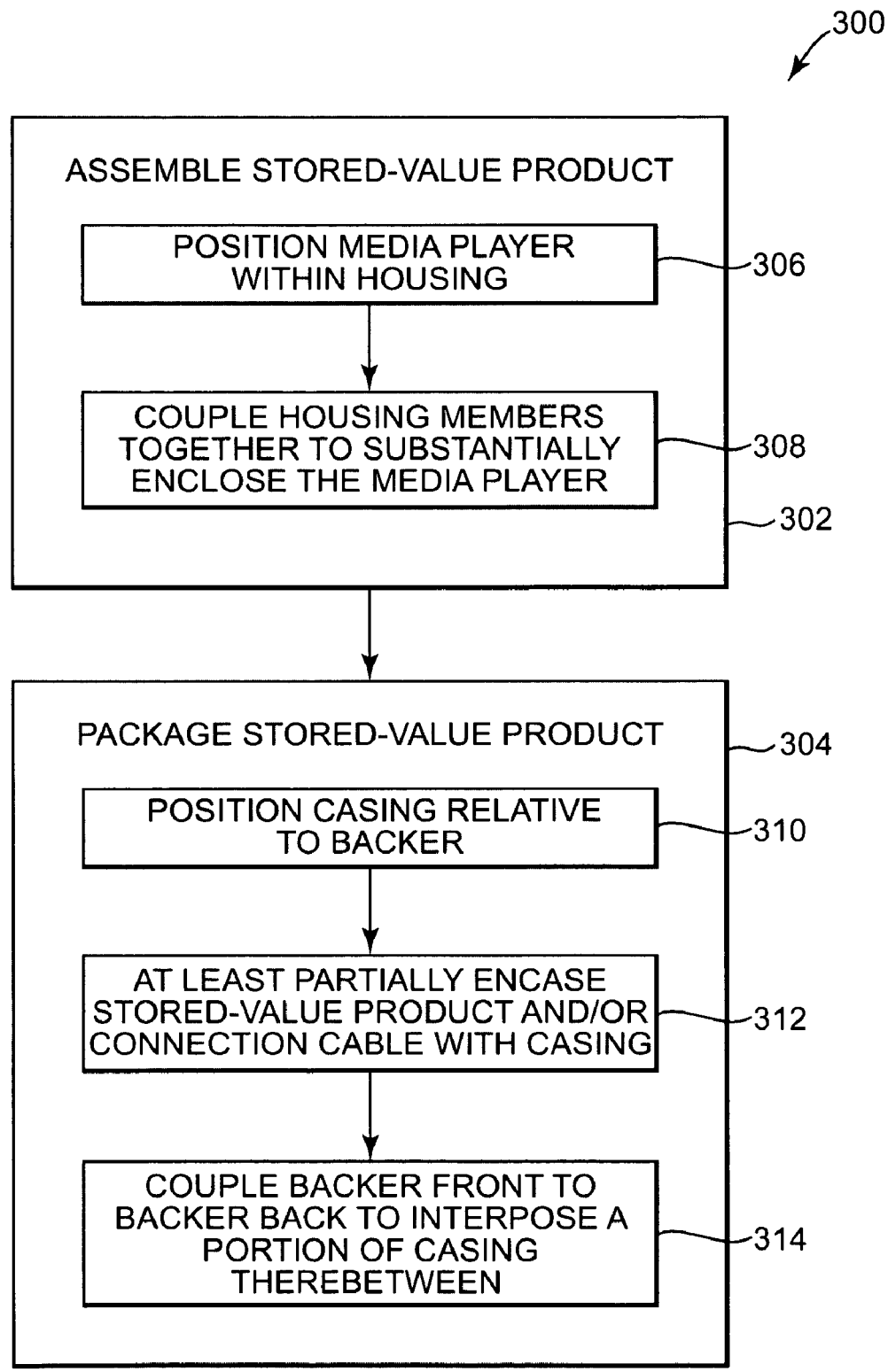
FIG. 16 is a flow chart illustrating a method of assembling a stored-value product, according to one embodiment of the present invention.

FIG. 16 is a flow chart illustrating one embodiment of a method 300 of assembling packaged good 240. Referring to FIG. 16 in view of FIGS. 9 and 14, at 302, stored-value card product 12 is assembled and, at 304, stored-value product 12 is packaged. In particular, in one embodiment, assembling stored-value product 12 at 302 includes positioning media player 32 within housing 30 at 306 as generally described above. For example, in one embodiment, printed circuit board 120 and the components attached thereto are positioned and secured at least partially within housing 30, for example, within base 40. In one embodiment, headphones 142 are coupled with printed circuit board 120, but are coupled to cover 42 and ear buds 164 are positioned to at least partially extend out of housing 30, such as via aperture 98. Subsequently, at 308, base 40 and cover 42 are coupled together, thereby enclosing at least a portion of media player 32 therebetween. In one embodiment, base 40 and cover 42 are coupled together such that a portion of each ear bud 164 is maintained outside of housing 30. As such, stored-value product 12 is assembled.

At 304, stored-value product 12 is packaged to form a retail product (i.e., packaged good 240). In one example, stored-value product 12 is coupled to backer 244 with any other selectively releasable material or device. More specifically, in one embodiment, at 310, tray 242 or other suitable casing is positioned relative to backer 244, in particular, to at least partially extend through opening 280. At 312, stored-value product 12 is positioned within tray 242 or other suitable casing as described above. In addition, other materials or items such as instructions, connection cable 18, coupons, etc., may also be placed within tray 242. In one embodiment, operation 310 is performed after operation 312.

At 314, backer 244 is folded about fold line 184 such that inside surface 262 of front 286 abuts and is secured to inside surface 162 of back 288. In this manner, flange 154 is secured between front 286 and back 288. As such, packaged good 240 is assembled and ready for shipment to and/or display in retail settings.

Figure 17:
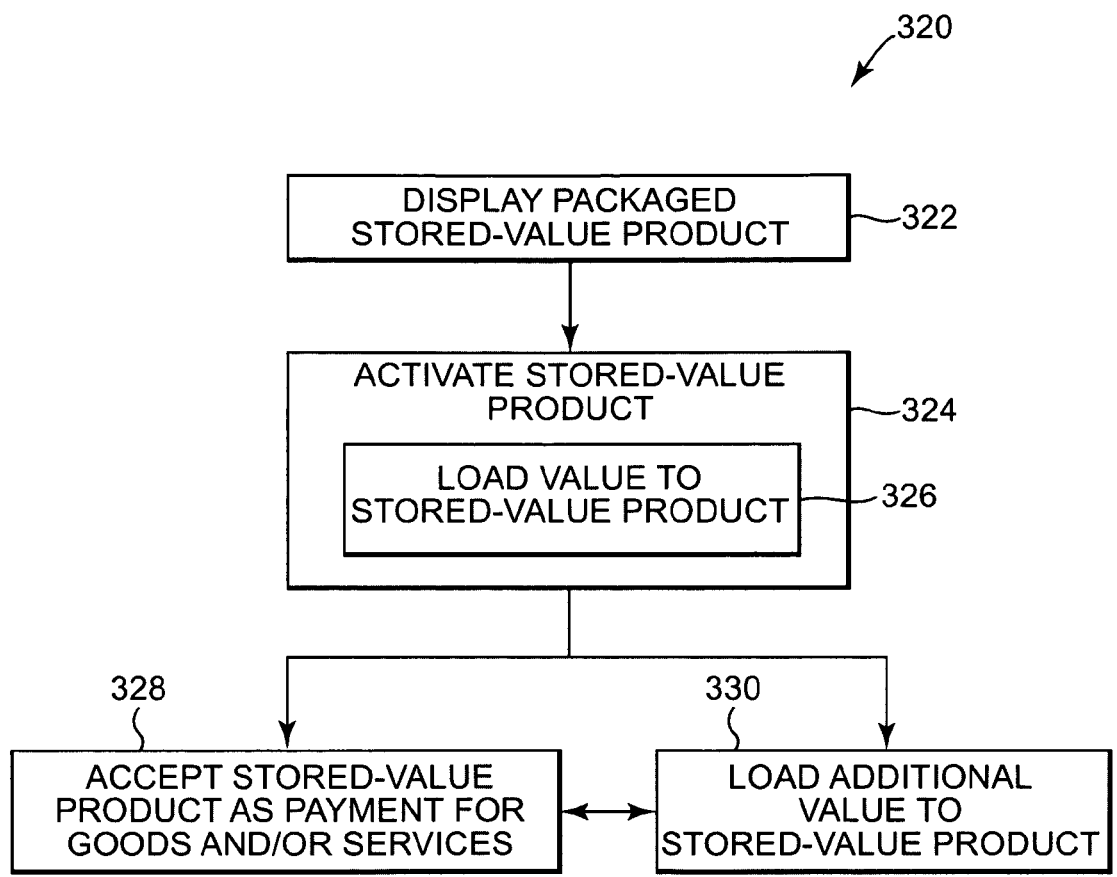
FIG. 17 is a flow chart illustrating a method of encouraging purchase and facilitating use of a stored-value product, according to one embodiment of the present invention.

FIG. 17 is a flow chart illustrating one embodiment of a method 320 of encouraging purchase and facilitating use of stored-value product 12 by consumers. At 322, stored-value product 12 is placed or hung from a rack, shelf, or other similar device to display stored-value product 12 for sale to potential consumers. In one example, stored-value product 12 is placed for retail sale when secured to backer 244. In one embodiment, a depiction of stored-value product 12 is placed on a website for viewing and purchase by potential consumers. In one embodiment, stored-value product 12 is displayed without backer 244.

At 324, a consumer who has decided to purchase stored-value product 12 presents the stored-value product 12 on backer 244, where backer 244 is used, to a retail store employee, retail store kiosk, or other person or device to read account identifier 100 of stored-value product 12 to access a financial account or financial record linked to account identifier 100. In particular, in one example, account identifier 100 is read or otherwise accessed through window 282 of backer 244. Upon accessing the financial account or financial record, at 326, value is added to the financial account or financial record. Thus, stored-value product 12 is activated and loaded. Once stored-value product 12 is activated and loaded, stored-value product 12 can be used by the consumer or any other bearer of stored-value product 12 to purchase goods and/or services at the retail store or other affiliated retail setting or website.

At 328, the retail store or other affiliated retail setting or website accepts stored-value product 12 as payment toward the purchase of goods and/or services made by the current bearer of stored-value product 12. In particular, the value currently loaded on stored-value product 12 is applied toward the purchase of goods and/or services. At 330, additional value is optionally loaded on stored-value product 12 at a POS terminal 14, kiosk, or other area of the retail store or related setting. Upon accepting stored-value product 12 as payment at 328, the retail store or related setting can subsequently perform either operation 328 or operation 330 as requested by a current bearer of stored-value product 12. Similarly, upon loading additional value on stored-value product 12 at 330, the retail store or related setting can subsequently perform either operation 330 again or operation 328. In one example, the ability to accept stored-value product 12 as payment for goods and/or services is limited by whether the financial account or financial record associated with stored-value product 12 has any value at the time of redemption.

Figure 18:
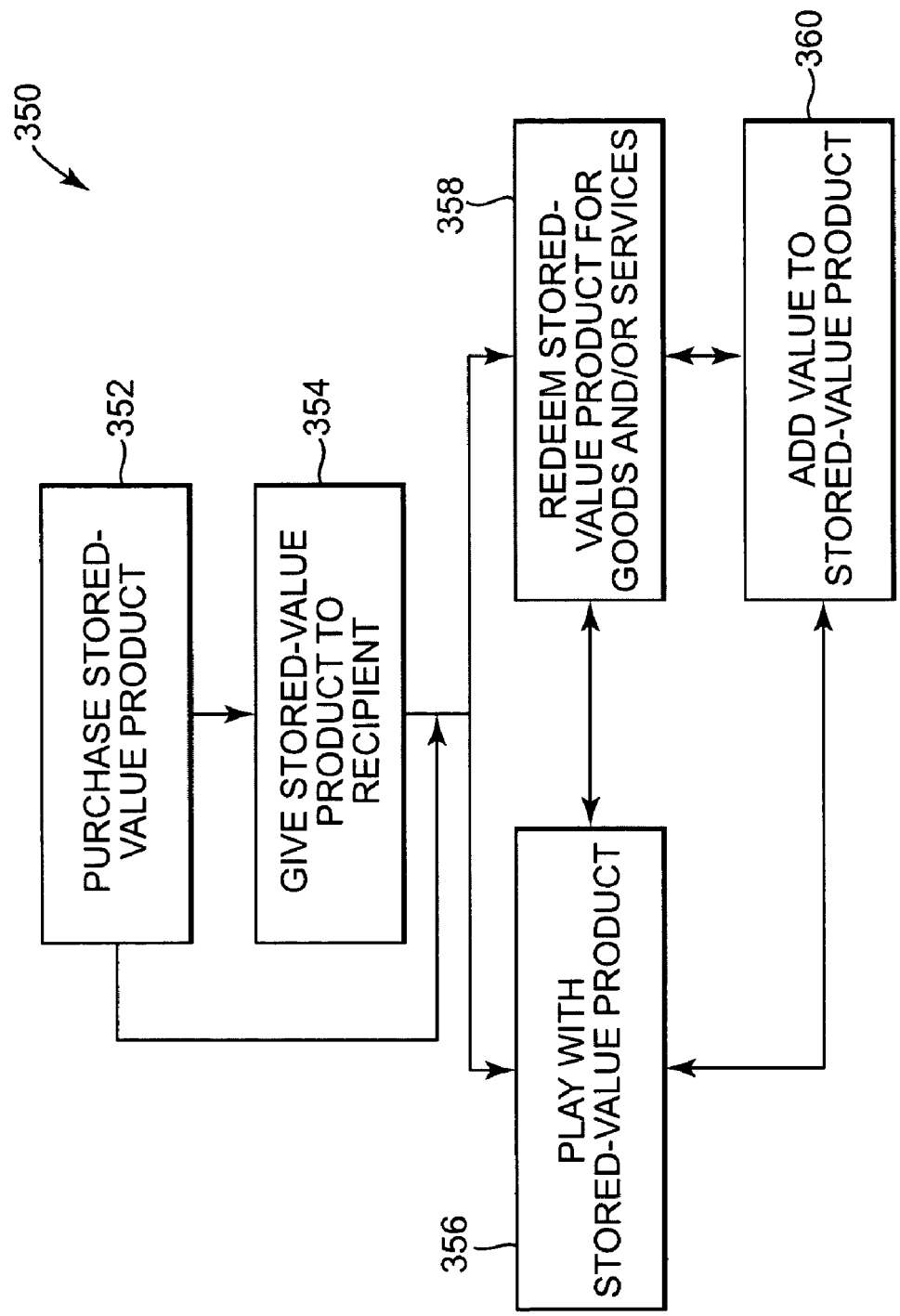
FIG. 18 is a flow chart illustrating a method of using a stored-value product, according to one embodiment of the present invention.

FIG. 18 is a flow chart illustrating one embodiment of a method 350 of using stored-value product 12. At 352, a potential consumer of stored-value product 12, which is displayed in a retail store or viewed on a website, decides to and does purchase stored-value product 12 from a retail store or website setting. Stored-value product 12 can be displayed and purchased alone or as part of a retail product along with backer 244. Upon purchasing a stored-value product 12, a retail store employee, a retail store kiosk, or other person or device scans or otherwise reads account identifier 100. In one embodiment, account identifier 100 is read through window 282 of backer 244 with a scanner 298 of POS terminal 14 (FIG. 1). Although scanner 298 is generally illustrated as a scan gun, other scanners such as flat-bed in-line scanner, RFID arch or flat plat scanner, and/or any other suitable scanners may be used. Upon reading account identifier 100, the financial account or record linked to account identifier 100 is accessed and activated to load value onto stored-value product 12.

At 354, the consumer optionally gives stored-value product 12 to a recipient, such as a graduate, relative, friend, expectant parents, one having a recent or impending birthday, a couple having a recent or impending anniversary, etc. In one embodiment, a plurality of stored-value products 12 are purchased and given to party goers, such as at a birthday party, New Year's Eve party, for Christmas, etc. as party favors or gifts. As an alternative, the consumer can keep stored-value product 12 for his or her own use.

At 356, the consumer or recipient, whoever is in current ownership or otherwise is the current bearer of stored-value product 12, removes stored-value product 12 from backer 244 if stored-value product 12 is coupled with backer 244. For example, stored-value product 12 is removed from backer 244 by pulling back 288 of backer 244 away from font 286 of backer 244 or otherwise removing tray 242 from backer 244 to access stored-value product 12. Following this operation, the bearer of stored-value product 12 can optionally use or play with stored-value product 12.

For instance, consumer can couple stored-value product 12 with computing device 16 (FIG. 1) using connection cable 18 to upload and/or otherwise edit compressed media files stored to stored-value product 12 and/or can play media files stored to stored-value product 12 using media player 32 incorporated therein. In one embodiment, memory 136 (FIG. 11) of media player 32 is accessible similar to any pluggable storage device. For example, on a computing device 16 using a Windows operating system as offered by Microsoft Corporation, of Redmond, Wash., United States of America, when coupled with computing device 16, memory 136 is accessible via a MP3 Player software, Windows Explorer, or other suitable access software.

Media files stored to stored-value product 12 can be played at the direction of the user. In particular, headphones 142 are extended and ear buds 164 placed within one or more ear of the user. The user can flip lock switch 150 toward indicator light 156 to unlock media player 32 stored in housing 30. Pressing and holding the play/pause button 80 will turn on stored-value product 12 and cause illumination of indicator light 156. Once indicator light 156 is illuminated, media files are played by depressing the play/pause button 80 again. Different media files or tracks can be played by depressing the previous track or next track buttons 80. In addition, buttons 80 may be provided for controlling the output volume of the sound waves. When use is completed, stored-value product 12 is turned off by moving lock switch 150 away from indicator light 156 cord 162 is retracted, and ear buds 164 are positioned in aperture 98 for storage. Other methods of playing stored-value product 12 are also contemplated.

At 358, the current bearer of stored-value product 12 redeems stored-value product 12 for goods and/or services from the retail store or website. At 360, the current bearer of stored-value product 12 optionally adds value to stored-value product 12, and more particularly, to the financial account or financial record associated with stored-value product 12, at the retail store or over the Internet. Upon playing with or using stored-value product 12 at 356, redeeming stored-value product 12 at 358, or adding value to stored-value product 12 at 360, the current bearer of stored-value product 12 subsequently can perform any of operations 356, 358, or 360 as desired. In one embodiment, the ability of the current bearer to repeat redeeming stored-value product 12 at 358 is limited by whether the financial account or financial record associated with stored-value product 12 has any remaining value at the time of attempted redemption.

Although described above as occurring at a single retail store or website, in one embodiment, purchasing stored-value product 12 at 352, redeeming stored-value product 12 at 358, and adding value to stored-value product 12 at 360, can each be performed at any one of a number of stores adapted to accept stored-value product 12 or over the Internet. In one example, a number of stores are each part of a chain or similarly branded stores. In one example, a number of stores includes at least one website and/or at least one conventional brick and mortar store.

Stored-value products come in many forms. The "gift card" product, like other stored-value products, can be "re-charged" or "re-loaded" at the direction of the original consumer, the gift recipient, or third party. The term "loading on" or "loaded on" herein should be interpreted to include adding to the balance of a financial account or financial record associated with a stored-value product. The balance associated with the stored-value product declines as the product is used toward purchases, encouraging repeat visits. The consumer is encouraged to carry the stored-value product for alternative use as an MP3 player, which allows the stored-value product to serve as an advertisement or a reminder to the consumer to revisit the associated merchant. Stored-value products according to embodiments of the invention provide a number of advantages to both the consumer and the merchant. Other stored-value products according to embodiments of the invention include loyalty products, merchandise return products, electronic gift certificates, employee products, frequency tracking products, prepaid products, and other types of products and cards associated with or representing purchasing power or monetary value, for example.

Although the invention has been described with respect to particular embodiments, such embodiments are meant for illustrative purposes only and should not be considered to limit the invention. Various alternatives, changes, an modifications within the scope of the invention will be apparent to those of ordinary skill in the art upon reading this disclosure.

What is claimed is:

1. A financial transaction system including:
    a database storing a financial account or a financial record having a monetary value available for use as payment toward one or more purchases of one or more of goods and services; and
    a financial transaction product including:
        an electrical assembly,
        a housing at least partially enclosing the electrical assembly,
        a connection cable including a first end, which is coupled with the housing and in electrical communication with the electrical assembly, and a second end, which is opposite the first end, is spaced from the housing, and includes an electrical connector configured to selectively interface with an electrical device separate from the financial transaction product, and
        an account identifier affixed to the housing and linking the housing to at least one of the financial account or the financial record for loading the at least one of the financial account or the financial record with the monetary value.

2. The financial transaction system of claim 1, wherein the account identifier includes a bar code.

3. The financial transaction system of claim 1, wherein the account identifier includes at least one of a bar code, a magnetic strip, and a radio frequency identification device.

4. The financial transaction system of claim 1, wherein the electrical assembly is configured to receive electrical signals from the electrical device via the connection cable.

5. The financial transaction system of claim 1, wherein the electrical assembly includes an output device configured to output audible sound waves based on the electrical signals received via the connection cable.

6. The financial transaction system of claim 5, wherein the output device extends outside of the housing.

7. The financial transaction system of claim 6, wherein the output device includes headphones.

8. The financial transaction system of claim 5, wherein the electrical assembly includes an input switch controlling a volume of the audible sound waves produced by the output device.

9. The financial transaction system of claim 1, wherein the electrical assembly is configured to convert analog signals into audible sound waves.

10. The financial transaction system of claim 1, wherein the electrical connector is a universal serial bus (USB) connector.

11. The financial transaction system of claim 1, wherein the connection cable is readily removably coupled with the housing and the electrical assembly.

12. The financial transaction system of claim 1, wherein the account identifier is included on an external surface of the housing.

13. The financial transaction system of claim 1, further comprising:
    a backer configured to collectively support the financial transaction product for display, the backer including a window providing access to the account identifier through the backer.

14. A stored-value product system comprising:
    a stored-value product including:
        means for playing audible sound waves based on electrical signals,
        means for supporting the means for playing audible sound waves,
        means for selectively interfacing and communicating with a device separate from the stored-value product, wherein the means for selectively interfacing and communicating includes means for receiving electrical signals from the device and for transferring the electrical signals toward the means for playing audible sound waves, wherein the audible sound waves are based on the electrical signals, and the means for selectively interfacing and communicating with the device extends away from the means for supporting to define a connector spaced from the means for supporting and configured to selectively interface with the device,
        means for associating the means for supporting with a financial account such that the stored-value product facilitates use of funds from the financial account toward the purchase of one or more of goods and services, wherein the means for associating comprises means for loading the financial account with a monetary value available for application toward a purchase of the one or more of goods and services; and a database storing the financial account having an associated value of funds available toward the purchase of one or more of goods and services such that the stored-value product, via the means for associating, provides access to the associated value of funds for application toward the purchase of the one or more goods and services.

15. The stored-value product system of claim 14, wherein the means for playing audible sound waves is part of an electrical assembly, and the means for supporting includes means for substantially enclosing the electrical assembly.

16. The stored-value product system of claim 15, wherein the means for playing audible sound waves extends at least partially outside of the means for substantially enclosing.

17. The stored-value product system of claim 15, wherein the connector is a universal serial bus (USB) connector and is configured to be removably coupled to the stored-value product.

18. A method of encouraging purchase and facilitating use of a financial transaction product, the method comprising:

displaying the financial transaction product including an output device, a supporting member, and an elongated connecting cable in electrical communication with the output device, wherein the elongated connecting cable extends away from a remainder of the financial transaction product, the elongated connecting cable includes an electrically connective end opposite the remainder of the financial transaction product and is configured to selectively interface with an electrical device, which is separate from the financial transaction product, to facilitate communication of electrical signals from the electrical device to the financial transaction product, the financial transaction product is configured to output sound waves corresponding with the electrical signals via the output device of the financial transaction product, and the financial transaction product includes an account identifier supported by the supporting member and including an account identifier linked to at least one of a financial account and a financial record; and activating the financial transaction product including using the account identifier to access the at least one of the financial account and the financial record, wherein activating the financial transaction product readies the financial transaction product for subsequent use as at least partial payment for one or more of goods and services;

wherein activating the financial transaction product comprises loading the financial account or the financial record with a monetary value available for application toward a purchase of the one or more of goods and services, the at least one of the financial account and the financial record is stored in a database, and the method further comprises:

accepting the financial transaction product during the purchase of the one or more of goods and services including debiting the at least partial payment from the monetary value available for application toward the purchase, wherein the purchase occurs subsequent to activating the financial transaction product.

19. The method of claim 18, wherein the output device is included in an electrical assembly of the financial transaction product, and displaying the financial transaction product includes substantially enclosing the electrical assembly within a housing, and the connecting cable extends at least partially out of the housing.

20. The method of claim 19, wherein providing the financial transaction product includes providing the output device such that the output device is at least partially positioned outside of the housing, and the electrical device is a computing device.

21. The method of claim 18, wherein the one or more of goods and services are goods and services other than the financial transaction product.

\* \* \* \* \*